United States Patent
Nguyen et al.

(10) Patent No.: US 8,688,147 B2
(45) Date of Patent: Apr. 1, 2014

(54) SYSTEM AND METHOD FOR LOCATION-BASED, INTERACTIVE CONSUMER ENGAGEMENT PLATFORM

(71) Applicants: Nhan Nguyen, Lafayette, CA (US); Shoaib Mian, Dublin, CA (US); Michael S. Smith, Los Altos, CA (US); Ryan Ross, Menlo Park, CA (US); Steve Zelinger, Palo Alto, CA (US)

(72) Inventors: Nhan Nguyen, Lafayette, CA (US); Shoaib Mian, Dublin, CA (US); Michael S. Smith, Los Altos, CA (US); Ryan Ross, Menlo Park, CA (US); Steve Zelinger, Palo Alto, CA (US)

(73) Assignee: SweetSpot-WIFI, Palo Alto, CA (US)

( * ) Notice: Subject to any disclaimer, the term of this patent is extended or adjusted under 35 U.S.C. 154(b) by 0 days.

(21) Appl. No.: 13/663,423

(22) Filed: Oct. 29, 2012

(65) Prior Publication Data
US 2013/0109412 A1   May 2, 2013

Related U.S. Application Data

(60) Provisional application No. 61/553,182, filed on Oct. 29, 2011.

(51) Int. Cl.
| | |
|---|---|
| *H04W 24/00* | (2009.01) |
| *H04M 3/00* | (2006.01) |
| *H04M 3/42* | (2006.01) |
| *G06F 19/00* | (2011.01) |
| *G06Q 30/00* | (2012.01) |

(52) U.S. Cl.
USPC ............... 455/456.3; 455/414.1; 455/418; 463/41; 705/14.58; 705/14.69

(58) Field of Classification Search
USPC ........................................... 455/456.3
See application file for complete search history.

(56) References Cited

U.S. PATENT DOCUMENTS

| | | | |
|---|---|---|---|
| 7,024,195 | B2 | 4/2006 | Miriyala et al. |
| 2003/0078042 | A1 | 4/2003 | Miriyala et al. |
| 2008/0074264 | A1 | 3/2008 | Sharpe et al. |
| 2008/0154696 | A1* | 6/2008 | Spiegelman et al. ........... 705/10 |

(Continued)

FOREIGN PATENT DOCUMENTS

| | | |
|---|---|---|
| DE | 19935537 A1 | 2/2001 |
| DE | 102007047181 A1 | 4/2009 |

(Continued)

OTHER PUBLICATIONS

Alqerem, Ahmad, et al., "Location Dependent Transaction for Mobile Environment", IEEE (2006), pp. 2926-2928.

(Continued)

*Primary Examiner* — Timothy Pham
(74) *Attorney, Agent, or Firm* — LeClairRyan, a Professional Corporation

(57) ABSTRACT

A location based wireless consumer interactive system is disclosed. The system includes a first gateway device stationed at a first location which includes a first antenna configured to generate a first wireless zone covering a preassigned area proximal to the first location. The first gateway device includes a first network interface coupled to the first antenna which is configured to communicate with a client device that is connected to the first wireless zone. The first gateway device includes a first memory configured to store a first content profile received from a server device via the first network interface, wherein the first memory stores executable programming instructions to process preloaded consumer content of the first content profile. The first gateway device includes a first processor configured to generate a first interactive content site containing the consumer content on the client device.

11 Claims, 10 Drawing Sheets

(56) References Cited

U.S. PATENT DOCUMENTS

| | | | |
|---|---|---|---|
| 2008/0287142 A1 | 11/2008 | Keighran | |
| 2009/0005079 A1* | 1/2009 | Shields et al. | 455/456.3 |
| 2009/0171781 A1* | 7/2009 | Allen et al. | 705/14 |
| 2009/0197620 A1 | 8/2009 | Choi et al. | |
| 2010/0197323 A1 | 8/2010 | Freeburg et al. | |
| 2010/0279665 A1* | 11/2010 | Hardin et al. | 455/414.1 |
| 2010/0291907 A1 | 11/2010 | MacNaughtan et al. | |
| 2011/0060652 A1 | 3/2011 | Morton | |
| 2011/0178863 A1 | 7/2011 | Daigle | |
| 2011/0223937 A1* | 9/2011 | Leppanen et al. | 455/456.2 |
| 2011/0251900 A1* | 10/2011 | Link et al. | 705/14.64 |
| 2012/0066066 A1 | 3/2012 | Jain et al. | |
| 2012/0088487 A1 | 4/2012 | Khan | |
| 2012/0158297 A1 | 6/2012 | Kim et al. | |
| 2012/0208564 A1 | 8/2012 | Clark et al. | |

FOREIGN PATENT DOCUMENTS

| | | |
|---|---|---|
| GB | 2444965 A | 6/2008 |
| JP | 2003248776 A | 9/2003 |
| JP | 2005242459 A | 9/2005 |
| JP | 2008129774 A | 6/2008 |

OTHER PUBLICATIONS

Dhar, Subhankar et al., "Challenges and Business Models for Mobile Location-based Services and Advertising", Communications of the ACM, May 2011, vol. 54, No. 5, pp. 121-129.

Lim, Say Ying, et al., "Mobile Information Processing Incorporating Location-Based Services", 2005 3rd IEEE Int'l Conf. on Industrial Informatics, pp. 7-12.

Shi, Xiaoyu, et al., "Tour-Guide: Providing Location-Based Tourist Information on Mobile Phones", 2010 10th IEEE Int'l Conf. on Computer and Information Technology, pp. 2397-2401.

Chang, CH, "Mobile Advertising," National Central University, Chung-Li, 201 1.07.28, See Introduction, 1. Related Work, 1.3 Mobile Advertising, 2.2 System Architecture: figure 1.

IAB Local Committee, "Targeting Local Markets: An IAB Interactive Advertising Guide." Retrieved from the Internet <URL: www.iab.net/targeting_local>, Sep. 2010, pp. 3-17.

Written Opinion & International Search Report, PCT/US2012/062496.

* cited by examiner

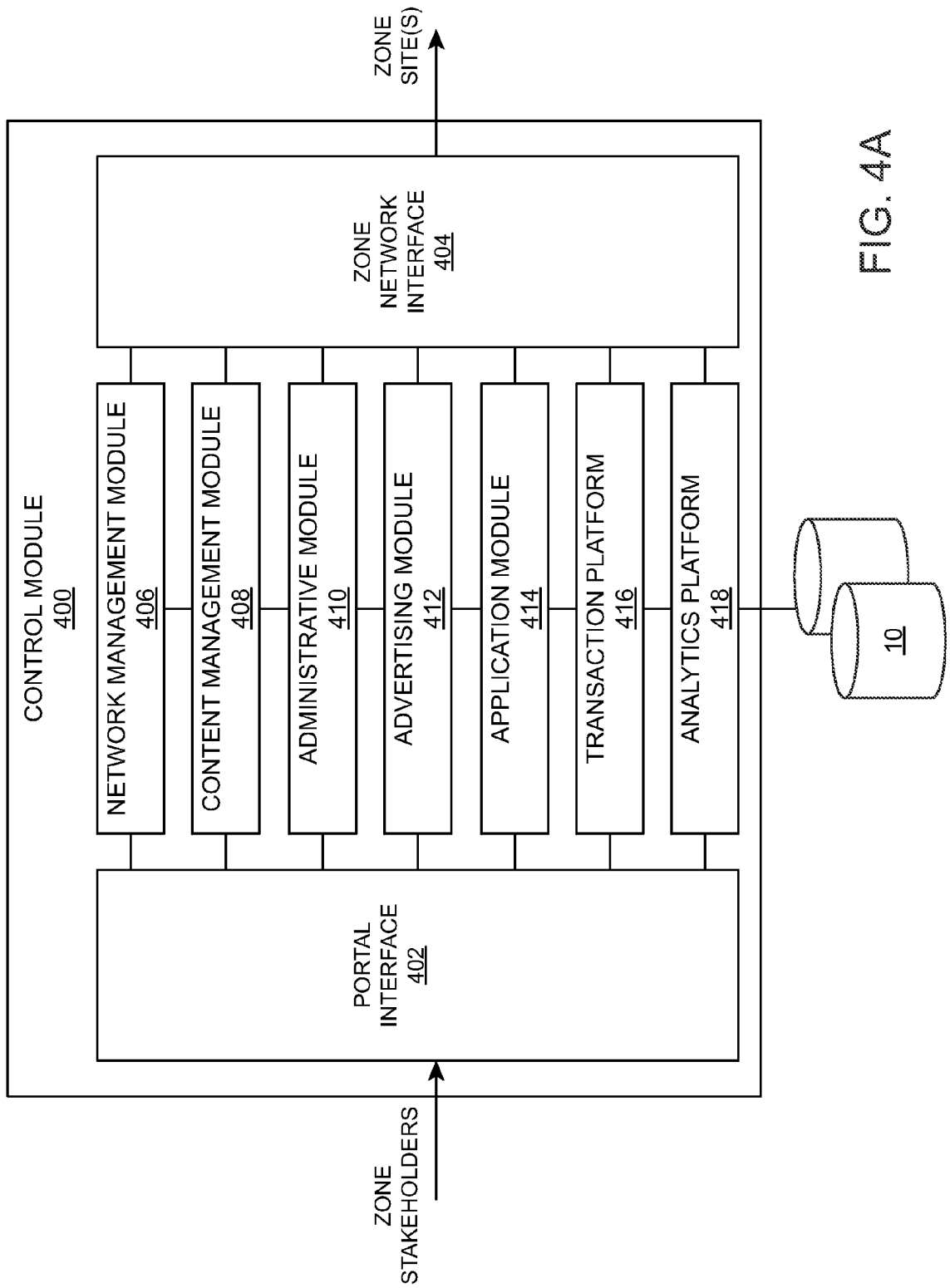

SYSTEM AND METHOD FOR LOCATION-BASED, INTERACTIVE CONSUMER ENGAGEMENT PLATFORM

The present application claims the benefit of priority based on U.S. Provisional Patent Application Ser. No. 61/553,182, filed on Oct. 29, 2011, in the name of R. Ryan Ross et al., and entitled "System and Method for Distributing Rich Content to Mobile Devices at the Point Of Decision", which is hereby incorporated by reference.

FIELD

The present disclosure relates to a system and method for location-based, interactive consumer engagement platform.

BACKGROUND

Consumer Electronic (CE) devices have evolved to powerful mobile devices, capable of processing rich interactive multimedia content. Most mobile devices are currently shipped with standard Wireless LAN (WLAN) interfaces, like 802.11 WiFi. Powerful, WLAN-enabled, mobile devices provide access to rich interactive internet content, thereby enabling many new uses and applications for such devices.

Solutions that utilize mobile devices in retail settings have traditionally been limited to basic, low bandwidth applications, and accordingly have not been very successful at integrating the different capabilities of a smart phone. One popular approach includes sending offers and coupons via SMS, as text, or including short URLs, to registered consumer's mobile phones. Upon receiving such an SMS the consumer can click on the URL to view details via the device's browser. The quality of a loaded page depends on several factors, including the subscribed data plan, or the available coverage at that specific location.

Commercial locations like 'big box' retail stores, malls, and event venues are typically not equipped with ubiquitous WLAN networks, and hence often miss out on the opportunity to interact with consumers via rich content at the point of decision, in the same way online retailers do. Some commercial locations offer kiosks which can be used to provide rich access to product information. However, there are several shortcomings with this approach, including the need to deploy multiple kiosks at strategic locations in a store or at a venue, as well as the requirement for consumers to walk over to a kiosk, line up, and limit their visit to allow others a chance who may be waiting for their turn.

Retail payment applications are often accomplished via contact-based or contactless device-to-POS interactions (e.g., RFID, or NFC), typically avoiding any form of WAN-based internet access as part of the solution, in order to avoid connectivity issues at the point of sale where time is critical.

There is a need in the art for a system and method that allows consumers to interact with rich localized product content at the point of decision via standard WiFi enabled mobile devices using web browsers.

SUMMARY

A location based wireless consumer interactive system is disclosed. The system includes a first gateway device stationed at a first location. The first gateway device includes a first antenna that is configured to generate a first wireless zone covering a preassigned area proximal to the first location. The first gateway device includes a first network interface coupled to the first antenna. The first network interface is configured to communicate with a client device that is connected to the first wireless zone. The first gateway device includes a first memory configured to store a first content profile received from a server device via the first network interface. The first memory is configured to store executable programming instructions to process preloaded consumer content of the first content profile. The first gateway device includes a first processor configured to execute the programming instructions, which causes the first processor to generate a first interactive content site containing the consumer content of the first content profile and send the first interactive content site to the client device.

The system includes a second gateway device stationed at a second location. The second gateway device includes a second antenna that is configured to generate a second wireless zone covering a preassigned area proximal to the second location. The second gateway device includes a second network interface coupled to the second antenna. The second network interface is configured to communicate with a client device that is connected to the second wireless zone. The second gateway device includes a second memory configured to store a second content profile received from a server device via the second network interface. The second memory is configured to store executable programming instructions to process preloaded consumer content of the second content profile. The second gateway device includes a second processor configured to execute the programming instructions, which causes the second processor to generate a second interactive content site containing the consumer content of the second content profile and send the second interactive content site to the client device.

In an aspect, the first and second zone gateway devices are located at a first zone site, wherein the first and second zones are configured to not geographically overlap.

In an aspect, the first content profile stored in the first memory of the first gateway device is different than the second content profile stored in the second memory of the second gateway device. Accordingly, the first interactive content site accessed by the client device is different content than the second interactive content site accessed by the client device.

In an aspect, the first and second gateway devices are configured to automatically display the second interactive web enabled site upon the client device moving from the first wireless zone to the second wireless zone.

In an aspect, a first product is located within the first wireless zone, wherein the first content profile includes first consumer content relating to the first product, such that the first consumer content is displayed on the client device while the client device is connected to the first wireless zone and the first product is physically located proximal to the client device.

In an aspect, the first gateway device is configured to restrict the client device from accessing web services other than the consumer content of the first content profile that is locally stored in the first memory.

In an aspect, the first gateway device is connected to a Point of Purchase (POP) station, the first content profile configured to allow a user to perform a purchase transaction using a pay service via the first web enabled interactive site, wherein the first gateway device communicates the purchase transaction with the POP station and the pay service.

In an aspect, the first gateway device is remotely configurable via a control system executed on a network device configured to communicate with the first gateway device via a zone stakeholder interface.

In an aspect, a first gain of the first antenna and a second gain of the second antenna are remotely adjustable via the zone stakeholder interface.

In an aspect, the first gateway device is configured to automatically receive an updated version of the first content profile from the control system via the network interface, wherein the first gateway device processes the updated version to be able to send updated consumer content for the updated first content profile to the client device for display.

In an aspect, the first gateway device is configured to execute a first application received from the control system and locally stored in the first memory, wherein the client device executes a first service associated with the first application via the first gateway device.

In an aspect, at least the first and second gateway devices are configured to collect user activity data when the client device, wherein the first and second gateway devices transmit the collected user activity data to a zone network database, wherein analyzed data associated with the collected user activity data can be viewed via the zone stakeholder interface.

In an aspect, the first gateway device further comprises a locator component configured to determine a location of the client device while at the zone site.

In an aspect, the first content profile further comprises a content template including one or more template components, wherein each template component is configured to have corresponding assigned consumer content portion, wherein each assigned consumer content portion for the first profile is stored in the first memory.

In an aspect, the first content profile includes deployment information identifying the first zone gateway device to receive the associated consumer content.

In an aspect, the first content profile includes deployment information identifying a third zone gateway device to receive the associated consumer content the third zone gateway device located at a third location at a second zone site remote from the first zone site.

BRIEF DESCRIPTION OF THE DRAWINGS

FIG. 4A illustrates a block diagram of the control center module in accordance with an aspect of the present disclosure;

DETAILED DESCRIPTION

Figure 1A:
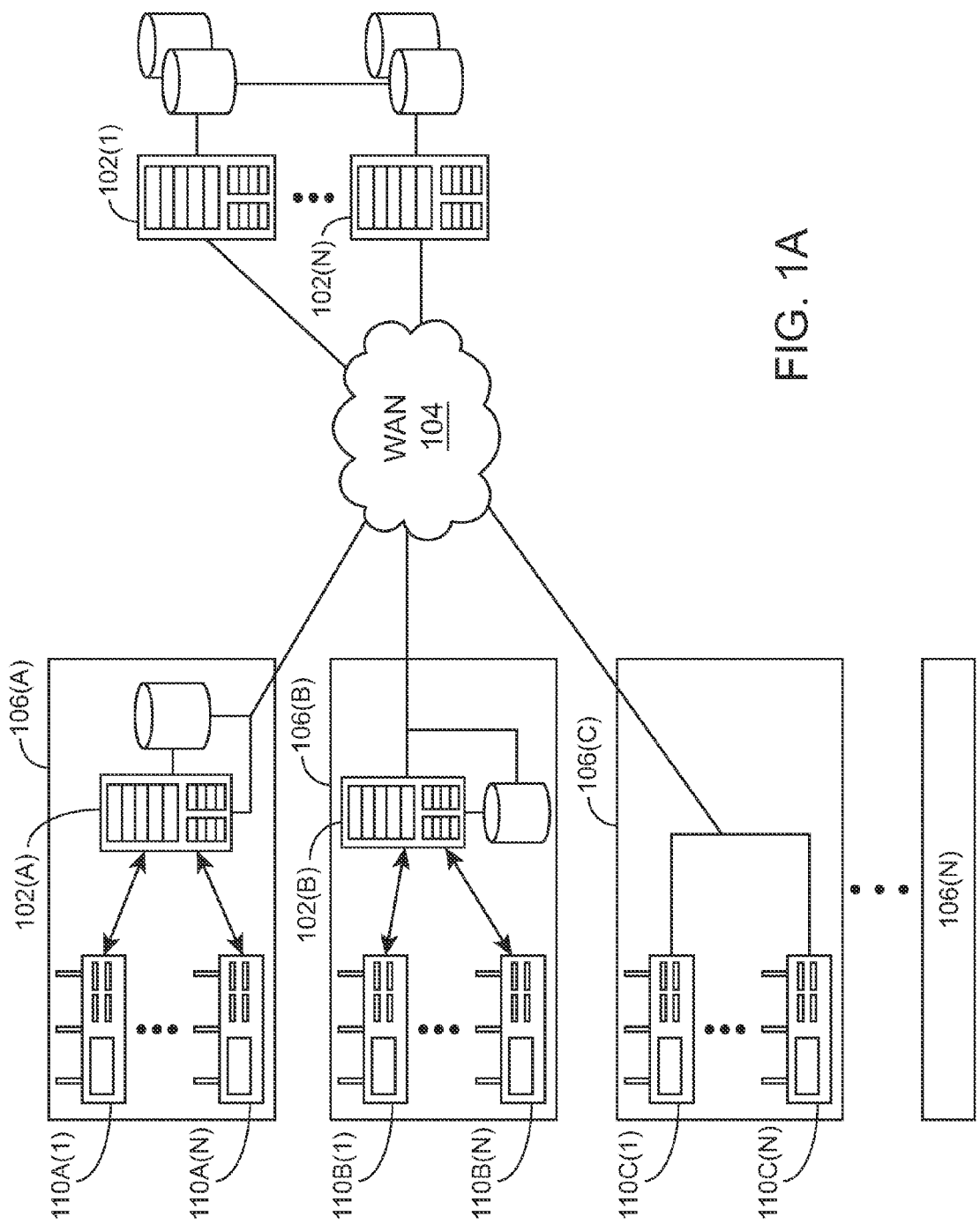
FIG. 1A illustrates a diagram of an example system environment utilizing zone systems having one or more zone gateway devices in accordance with an aspect of the present disclosure.

In general, the present disclosure is directed to a zone network system including a plurality of zone gateway devices that are configured to generate wireless WiFi hotspot zones. Each gateway device also is configured to provide unique localized consumer content within its respective zone, whereby the consumer content is displayable on connected client devices operated by consumers. By providing a closed zone hotspot, the consumer content that is provided to the consumers is easily controlled. Further, by storing the consumer content locally on the gateway device, the delivery of the content is relatively faster and of richer quality since no mobile or land-based wide area networks are not tasked to provide content on a per use basis.

The zone network system is designed to allow consumer content to be remotely uploaded by zone stakeholders to the system, whereby the system utilizes logic to efficiently push the uploaded consumer content to the appropriate identified zone gateway devices in the zone network in a cascading manner. In other words, the consumer content needs to be created and uploaded once. Once uploaded, the zone network system automatically deploys the consumer content based on parameters already in place.

There are several advantages with the zone network system. The ability for consumer content to be locally stored on the zone gateway devices allow faster, rich quality consumer experience. The ability to configure each zone gateway device to produce a zone of desired size and strength allows for specific locations where consumers interact with the system. The zone network system has the ability to track and monitor consumer activity when interacting with the gateway devices, thereby providing opportunities in gaining deeper insight and understanding of consumer behavior at any zone site.

In particular to the present description, a zone stakeholder is one who is able to configure one or more zone gateway devices 110 to operate in a desired way. Some examples of zone administrators are merchants, product sponsors, advertising agencies or media buyers, third party payment vendors, zone site service providers and/or anyone else who is given access to the zone network and/or one or more zone gateway devices 110.

A zone network may be configured to be at one or more physical zone sites, such as a physical indoor and/or outdoor location where one or more zone gateway devices are set up and configured to establish and maintain one or more wireless zones. The zone site may be a store where goods and services are sold, rented, leased, or otherwise promoted. Some non-limiting examples include department stores, convenience stores, automobile dealerships, restaurants, bars, educational institutions, business campuses, and the like. In an aspect, the zone site may be one or more buildings which house and manage several commercial or retail sites, such as a stadium, arena, airport, casino, ski resort, ocean cruise liner, transit station, and the like. In an aspect, the zone site includes areas not only within the building(s) but also/alternatively outside the buildings, such as parking lot (e.g. auto dealership), gas pumps, garden centers, and the like. A zone site may not only be stationary, but can be mobile and encompass, cars, boats, busses, subway trains, commuter trains, airport shuttles and the like.

Consumer content can include, but is not limited to, advertisements, product information, product details, offers, promotions, audio, video, games, coupons, brand graphics, photos, links, embedded video, polls, offers for news updates, loyalty points or rewards, wait lists, local social interactions and the like. Such consumer content may include present offers and/or earned loyalty points information to users, inciting them to visit the associated convenience store 99 for additional shopping, use their gas credit card, etc. Alternatively consumers can also be provided discounts for additional services like a car wash, oil change etc.

FIG. 1A illustrates a diagram of an example system environment that implements and manages a plurality of zone networks having one or more zone gateway devices in accordance with an aspect of the present disclosure. In particular, the example system environment 100 includes a plurality of network devices such as one or more network server devices 102(1)-102(N) connected to a plurality of network-enabled zone sites 106(A)-106(N), wherein each zone network includes one or more zone gateway devices 110. It should be noted that the environment 100 could include other numbers and types of devices in other arrangements. It should be noted that the term "network devices" can be referred to as encompassing one or more client devices, one or more servers, virtual machines and/or other components in the system 100. It should also be noted that although the zone systems, and their components, as well as the servers may be referred to herein in the plural, it is contemplated that only one zone system or zone systems can have one component and/or the server may be considered as singular without being limiting to the language used herein. It should be understood that the particular configuration of the system 100 shown in FIG. 1 are provided for exemplary purposes only and is thus not limiting.

The servers 102(1)-102(N) comprise one or more network devices or machines capable of providing Web-based and/or non Web-based applications, content and other data to one or more zone gateway devices 110 among one or more zone networks 106(1)-106(N) in a cascading manner via the network 104. In particular, the servers 102(1)-102(N) may push content profiles and associated data as well as user profile and policy information to one or more zone sites 106(1)-106(N). In an aspect, one or more servers 102(1)-102(N) include a control module 400 (FIG. 4A) which allows one or more zone stakeholders to access and view information relating to one or more zone gateway device 110 as well as review analytics information provided from their accessible zone gateway device(s) 110. Further, one or more zone stakeholders may create and deploy created content to one or more zone gateway devices 110 using the control module 400 (FIG. 4A), as will be discussed in more detail below.

The servers 102(1)-102(N) are configured to also provide Web page(s), image(s) of physical objects, user account information, streaming video, audio and/or live broadcasts and any other objects and information. The servers 102(1)-102(N) may also be configured to retrieve analytics information, user activity information, payment transaction information and the like from one or more components of the zone systems 106(1)-106(N). It should be noted that the servers 102(1)-102(N) may perform other tasks and provide other types of resources not specifically mentioned above.

In an aspect, one or more servers 102(1)-102(N) are connected to one of more storage means which hold data that it utilized to operate as well as manage the environment 100. In an aspect, one or more servers 102 may comprise a cluster of a plurality of servers which are managed by a network traffic management device (e.g. firewall, load balancer, web accelerator), gateway device, router, hub and the like. In an aspect, one or more servers 102(1)-102(N) may implement a version of Microsoft® IIS servers, RADIUS servers and/or Apache® servers, although other types of servers may be used and other types of applications may be available on the servers 102(1)-102(N).

Network 104 comprises a publicly accessible network, such as the Internet, which handles communication between the zone gateway devices 110 in zone sites 106(A)-106(N) and the servers 102(1)-102(N) via an IEEE 802.11 WiFi connection and/or a mobile network connection. However, it is contemplated that the network 104 may comprise other types of private and public networks. Communications between client devices 101(A)-101(N), zone sites 106(1)-106(N) and servers 102(1)-102(N) preferably take place over the network 104 according to standard network protocols, such as the HTTP, UDP, RADIUS and TCP/IP protocols and the like.

Further, it should be appreciated that the network 104 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), cable, fiber optic, wireless links including satellite links and other communications links known to those skilled in the relevant arts.

Each zone network 106(A)-106(N) comprises one or more network zone gateway devices (generally referred to as reference numeral 110) set up among one or more geographic zone sites. In particular to FIG. 1A, a first zone network 106(A) includes one or more zone gateway devices 110A(1)-110A(N). In an aspect, although not necessary, the one or more zone gateway devices 110A(1)-110A(N) can communicate with one or more merchants' own computer network, such as one or more servers and/or databases via dedicated means or via the cloud.

Additionally to FIG. 1A, a second zone network 106(B) includes one or more zone gateway devices 110B(1)-110B(N) which communicate with the servers 102(1)-102(N) over the network 104. In an aspect, the one or more zone gateway devices 110B(1)-110B(N) can communicate with one or more merchants' own computer network, such as one or more servers and/or databases via dedicated means or via the cloud.

In an aspect, as shown in FIG. 1A, the environment 100 may include a third zone network 106(C) which includes one or more zone gateway devices 110C(1)-110C(N) which communicate directly with the servers 102(1)-102(N) over the network 104. In an aspect, the one or more zone gateway devices 110C(1)-110C(N) do not communicate with a dedicated network device to the merchant. It should be noted that any number of zone networks 106(N) are contemplated and are thus not limited to the three zone networks shown in FIG. 1A.

Each zone network 106 comprises one or zone gateway devices 110 configured to provide a wireless WiFi hotspot "zone" of predetermined strength and direction such that the zone covers a specific physical area of specified size. In particular, the gateway device 110, for its assigned zone, provides interactive web and/or non-web content to client devices 101 (hereinafter termed "consumer content") that are able to wirelessly connect to that gateway device 110 when physically within its assigned zone. The consumer content that a particular zone gateway device 110 provides in its zone is retrieved from a locally stored content profile that contains ready-made, finished consumer content that is already uploaded to the gateway device 110 from a control center module 400 (FIG. 4A). In an aspect, the consumer content loaded into the content profile for a particular gateway device 110 is predetermined based on actual physical goods and/or services that are in the geographic location of the zone. Accordingly, in an aspect, the consumer content that is to be displayed is unique to that zone.

One or more zone gateway devices 110 can be configured to communicate not only with client devices 101 but also with one or more other zone gateway devices 110 at the same zone site 106 and/or at another remote zone site 106. One or more zone gateway devices 110. Its also possible to create a secure ad hoc network communications platform using one or more zone gateway devices 110. In a scenario where purchases and transactions are being made with client devices at different locations in a zone site, such secure communications can be handled via the zone gateway devices which are automatically segmented by zones and/or other custom configurations. In another scenario, real time communications (e.g. VoIP, Chat, Instant Messaging, Video Conferencing, BBS, web) may be passed from one client device to another using the zone network without the need for a central messaging server. These 'staff' type services could run in parallel to the 'client' services on the same hardware (separated by VLAN, or encrypted SSIDs).

In one or more aspects, one or more zone gateway devices 110 may be configured such that its assigned zone is "closed", "partially closed", or "open". In an aspect where the zone is "closed", the zone gateway device 110 will not allow any zone-connected client device 101 to access and/or view any other websites or other web-related subject matter besides the locally stored consumer content that is provided in the zone by the gateway device 110. In the aspect where the zone is "partially closed", the zone gateway device 110 will partially restrict access for a zone-connected client device 101 to view the provided consumer content as well as one or more preselected websites (e.g. social media, websites of zone stakeholders, websites of goods/services physically located in zone). In the aspect where the zone is "open", the zone gateway device 110 allows unrestricted access to the user, thereby allowing the user to not only view the provided consumer content but also access and view any other websites while connected to the zone. More information of the zone gateway devices 110 are discussed below.

In accordance with the present disclosure, client devices 101 communicate with the zone gateway device 110 providing the zone to which the client devices 101 are connected. In an example, client devices 101 may be configured to run a Web browser or other software (e.g. mobile application) that provides a means for human users to communicate with one or more zone gateway devices 110. One or more Web-based or non Web-based applications may accordingly run on the zone gateway devices 110 and/or servers 102(1)-102(N) that provide the requested data to the client devices 101 and/or perform the requested instructions on behalf of the user. Client devices 101 may be devices owned or operated by users visiting the zone network 106 or may be network enabled electronic devices which are provided by a zone stakeholder as a display for visitors to engage and interact with at the zone site (e.g. promotional interactive displays, demonstration video game players).

Non-limiting and non-exhausting examples of such client devices 101 include, but are not limited to, personal computers, such as desktops, laptops, mobile phones and/or smart phones, kiosks, tablet devices, mini-tables, PDAs, set-up media boxes, multimedia centers, smart TVs and any other network enabled electronic device that communicates with one or more zone gateway devices 110 via a standard browser or dedicated mobile application (i.e. "mobile app") that comprise software code written in Java, C+, C++, HTML, Javascript, .Net frameworks and the like.

Figure 1B:
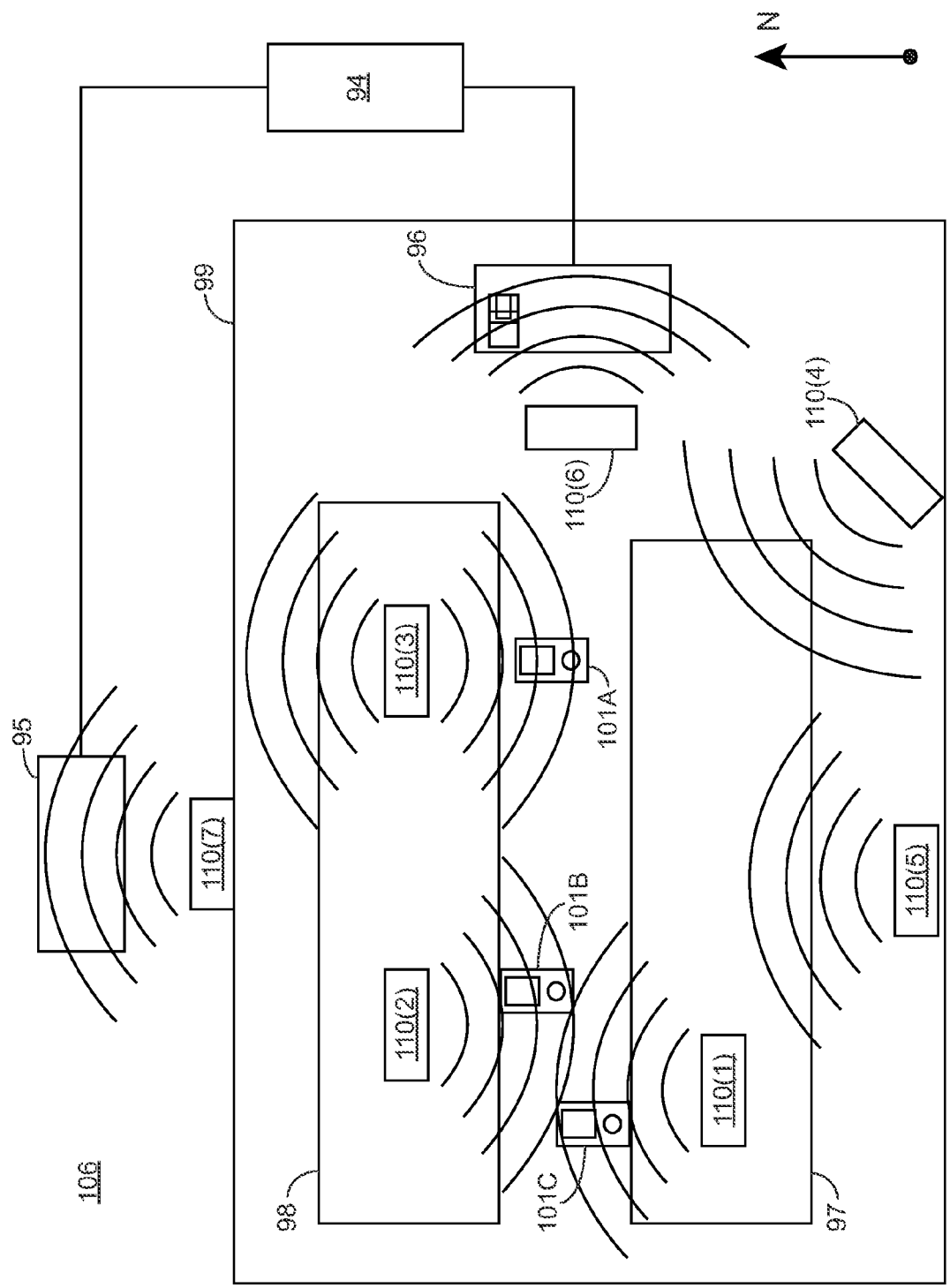
FIG. 1B illustrates a birds-eye view of a zone site utilizing a plurality of zone gateway devices in accordance with an aspect of the present disclosure.

FIG. 1B illustrates a birds-eye view of an example zone network utilizing a plurality of zone gateway devices in accordance with an aspect of the present disclosure. As stated above, a zone network 106 may be configured to be within a physical zone site, such as a physical indoor and/or outdoor location where one or more zone gateway devices 110 are set up and configured to establish and maintain one or more wireless zones. The zone site may be a store where goods and services are sold, rented, leased, or otherwise promoted. Some non-limiting examples include department stores, convenience stores, automobile dealerships, restaurants, bars, educational institutions, convention centers, business campuses, and the like. In an aspect, the zone site may be one or more buildings which house and manage several commercial or retail sites, such as a stadium, arena, airport, casino, ski resort, ocean cruise liner, transit station, and the like. In an aspect, the zone site includes areas not only within the building(s) but also/alternatively outside the buildings, such as parking lot (e.g. auto dealership), gas pumps, garden centers, and the like.

It should be noted that the zone site may be an outdoor venue, such as an open field, wherein the zone system can be removably set up and implemented for an event being held outdoors. The zone system is configured to be taken off-line, broken down or otherwise taken down and removed after the event has been held, such that the zone system can be temporarily implemented and operated during the event and later removed from the outdoor area without leaving any trace of being present in the area. In the aspect where the zone site is an outdoor area, such as an outdoor fair, one or more zone gateway devices can be set up at strategic locations and be loaded to uniquely showcase goods and/or services of some of the participating merchants. A visitor can connect to any one of the zone gateway devices and interact with the showcased content unique to the particular zone in which the client device is connected.

Referring back to the example in FIG. 1B, the zone network 106 is set up at a zone site comprising a building 99 where one or more zone gateway devices 110 are set up and configured to operate a plurality of zones. In particular, the example building 99 in FIG. 1B includes a north side aisle 98 and a south side aisle 97, both of which run parallel in the east-west direction. Additionally, one or more cashier counters 96 having a Point of Sale terminal (e.g. cash register, credit card reader) are located on the east side of the building 99, in this example. Further, in the example shown in FIG. 1B, the zone site includes an outside island 95, such as a gasoline island, garden center, automobile area and the like that is exterior to the building 99.

Regarding the example zone network 106 implemented in FIG. 1B, the zone network 106 comprises a first zone gateway device 110(1) selectively located at the west side of the south aisle 97; a second zone gateway device 110(2) selectively located at the west side of the north aisle 98; a third zone gateway device 110(3) selectively located at the east side of the north aisle 98; a fourth zone gateway device 110(4) selectively located at the south-east corner of the building 99; a fifth zone gateway device 110(5) selectively located at the south end of the building 99; a sixth zone gateway device 110(6) selectively located at the east side of the building 99 proximal to the cashier counter 96; and a seventh zone gateway device 110(7) configured to be located on the north side of the building, wherein the seventh zone gateway device 110(7) is configured to provide a zone that covers the area around the outdoor island 95. It should be noted that the number and location of gateway devices are exemplary and are not to be considered limiting in any way.

As mentioned, each zone gateway device 110 emits a wireless signal from one or more antennas to create and maintain one or more zones. Each zone gateway device 110 is selected by the zone stakeholders to be set up at specified location at the zone site prior to the zone network coming online. Additionally, during the set up process, each gateway device 110 is configured to emit an antenna signal of a pre-assigned gain and direction such that it's produced zone covers an assigned geographic location of predetermined strength and coverage based on configuration data provided to it by one or more zone stakeholders. Further, consumer content is preloaded on one or more zone gateway devices 110 in a content profile, wherein the content profile itself as well as the populated consumer content is determined by one or more zone stakeholder. More details regarding the set up process is discussed below.

Once the client device 101 is connected to a zone, that zone's responsible gateway device 110 will push the published consumer content to the client device 101, wherein the consumer content is viewable to the user through the client device's 101 web browser or a dedicated mobile software application configured to display such content. Such consumer content can include, but is not limited to, advertisements, product information, product details, offers, promotions, streaming media, audio files, video files, games, coupons, brand graphics, photos, links, embedded video, polls, offers for news updates, loyalty points or rewards, etc. Accordingly, the zone gateway device 110 can provide web as well as non-web based services.

Referring back to an example zone network at the zone site shown in FIG. 1B, a user operating client device 101A enters the building 99 and connects to a zone provided by gateway device 110(3), wherein soft drinks, juices and alcoholic drinks are stocked on the shelves at or near that zone. In this example scenario, the content profile loaded on zone gateway device 110(3) will contain consumer content sponsored by one or more zone stakeholders that is directed to one or more products and/or services that are physically located at or near the device's 110 zone. In particular to the present example, the zone gateway device 110(3) will push consumer content related to one or more soft drinks, one or more juices, and one or more alcoholic drinks (or their respective brand providers) to the client device 101A, as shown in FIG. 1C.

Figure 1C:
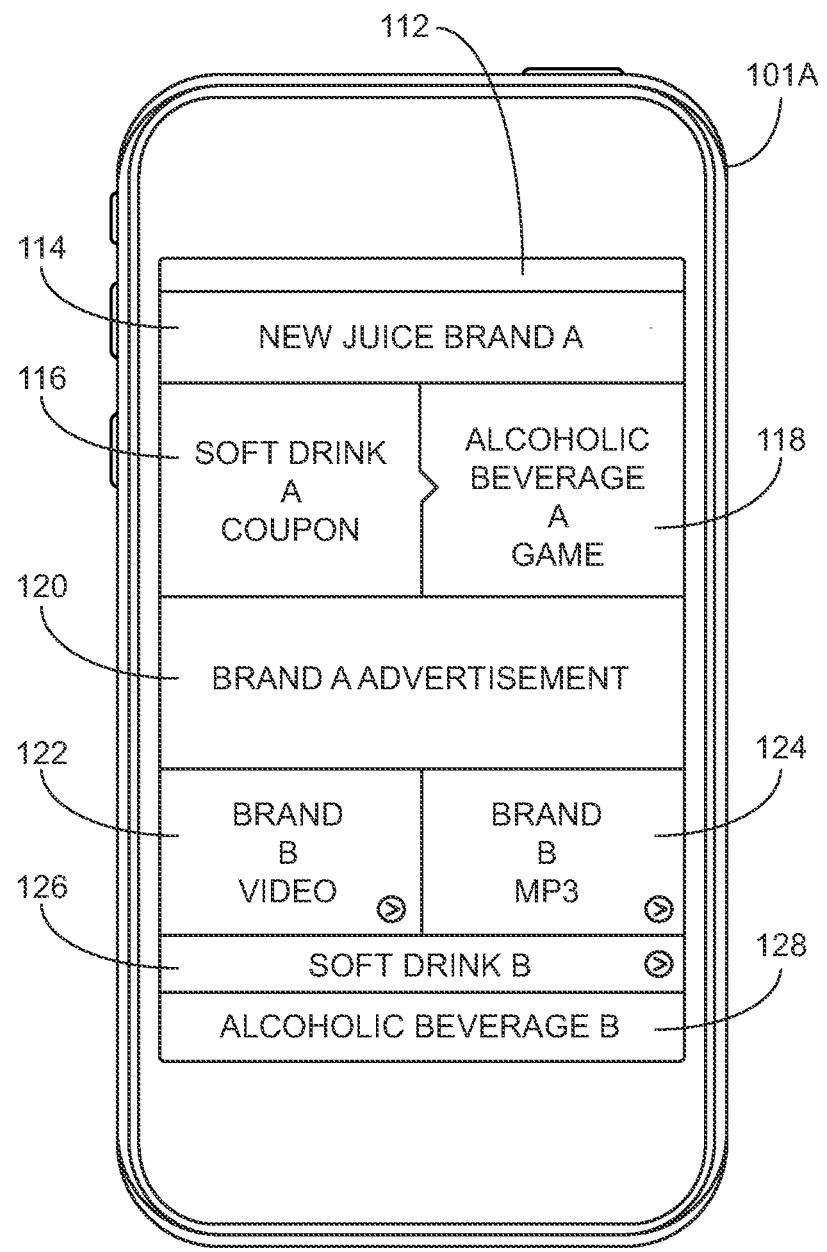
FIG. 1C illustrates an example screen shot of a client device displaying consumer content provided by a zone gateway device in a connected zone in accordance with an aspect of the present disclosure.

FIG. 1C illustrates an example screen shot of a client device displaying consumer content provided by a zone gateway device in a connected zone in accordance with an aspect of the present disclosure. As shown in FIG. 1C, client device 101A will receive pushed consumer content from zone gateway device 110(3), wherein the consumer content is displayed in a standard or customized web browser or other consumer content displayable software solution. As can be seen in FIG. 1C, the displayed consumer content is organized as a content template 112 that is organized into a plurality of separated template components 114-128. As will be discussed in more detail below, the consumer template 112 is designed by one or more zone stakeholders, wherein each template component is purchased/rented, maintained and operated by other zone stakeholders (e.g. product/service manufacturers, merchants, sponsors). With regard to the content template 112 in FIG. 1C, component 114 contains consumer content directed to a newly available juice produced by Brand A stocked on the shelf 98; component 116 is directed to a user redeemable coupon for a soft drink by Brand A stocked on the shelf 98; and component 118 is directed to a user playable video game for Brand A's alcoholic beverage. Additionally, component 120 contains consumer content directed to a playable music video sponsored by Brand B; component 122 contains consumer content directed to a downloadable audio file (e.g. mp3) sponsored by Brand B; and components 126 and 128 contains loyalty program consumer content directed to Brand B soft drinks and alcoholic beverages, wherein the consumer content allows the user to collect loyalty points for engaging in the content. For the user to be able to select any of the consumer content displayed in the content components, the user will merely need to select the appropriate component box, wherein additional web content will be displayed on the client device 101A.

As mentioned above, one or more (including all) zone gateway devices 110 at a particular zone site store content profiles which causes them to provide consumer content that is at least partially different from zone to zone. Referring back to the example in FIG. 1B, a user operating client device 101B that connects to gateway device's 110(2) zone will see different consumer content on his client device 101B than what is displayed on client device 101A. For example, gateway device 110(2) may display consumer content directed to dessert products, baking goods, and corresponding baking recipes, because dessert and baking products are on the shelves on the west end of shelf 98. In another example, a user with client device 101C may connect to a zone generated by gateway device 110(1) that is on the opposite side of the aisle from client device 101B, whereby the west side of shelf 97 houses small kitchen appliances. Accordingly, the user through client device 101C may view consumer content from gateway device 110(1) that is directed to advertised kitchen appliances, such as product specifications, side-by-side comparison features, reviews, on-line ordering (for home delivery or store pickup) and the like.

Accordingly, the zone network 106 provides several advantages to brand manufacturers as well as merchants considering that actual products/services will be physically close to the user while s/he is interacting with the consumer content directed to those products/services. The zone network 106 thereby increases the chances that consumers will end up purchasing those products and/or otherwise become more aware of those products as well as the brand and the brand manufacturers.

As shown in FIG. 1B, the zone site includes a cashier station 96 that is has a zone provided by zone gateway device 110(6). In an aspect, the zone gateway device 110(6) may push one or more payment solutions to a user's client device as he or she is checking out, thereby bypassing the need to pay the cashier by opting to pay for the purchased item(s) using the on-line payment solution via the client device. The zone gateway device 110 thereby provides a virtual point of sales terminal that is assigned to that zone and zone site. The consumer's payment options are selected from the list of participating third party payment vendors, wherein the selected third party payment vendor's service and back-end network architecture will work in conjunction with the zone network 106 to handle the transaction.

Zone gateway device 110(7) may allow the consumer or a zone stakeholder to view, via cookie, what zones were visited by the consumer, what content was accessed by the consumer, what offers or last minute deals were offered to the consumer prior to checking out. Zone gateway device 110(7) may provide a current or history of goods/services purchased by the consumer at that zone site and/or another zone site.

Some other general functions that one or more zone gateway devices 110 may be configured to perform include, but are not limited to: verifying name, age, shipping address of the consumer; allowing the consumer to review order, coupon and zone usage history; verifying physical location/coordinates of past purchases (within store, city, country); and providing shipping tracking information and status updates for items the consumer purchased at the zone site.

One example aspect of how the zone gateway devices 110 can be utilized, is a consumer is at a pharmacy and is purchasing a prescribed medication or medical device. Upon first-time purchase, pharmacists' explanation for proper use and drug interactions is often required prior to distribution to the consumer. More often than not, the consumer must wait in line and/or until the pharmacist is available. Consumer content can be loaded onto the zone gateway device 110 that has a zone covering the location of the pharmacy. While connected to this zone, the consumer can retrieve specific data, including a video describing or demonstrating proper use, obtain answers to FAQs, pose questions for the pharmacist that can be answered later by the pharmacist directly via email or other communication form. The zone gateway device 110 can then confirm that the consumer has viewed the video to completion and communicate to an appropriate service that pharmacy has met its regulatory requirement of providing the necessary information to the consumer. The zone gateway device 110 can then communicate with the pharmacy's network and "unlock" the item for sale by the cashier. This is advantageous in that it improves efficiencies for the consumer (by avoiding waiting), the pharmacist (by avoiding unnecessary diversion from core responsibilities especially at high-traffic times of the day. Other advantages are that critical health information is provided in a format that is more easily understood and digested by the consumer and can also be stored on the client device 101 for later re-viewing.

Another example scenario is directed to a patient at a clinic or hospital. The closed loop environment provided by the zone network 106 can allow one or more zone gateway devices 110 to provide encrypted and/or identification-verification based access to patient data that is maintained in an external database managed by the clinic and/or its electronic medical record (EMR) provider. As such, education/edification information can be delivered to patients' client devices 101 via the zone, wherein such information can be specific to their symptoms and/or conditions. Other services that can be implemented via the zone network include, but are not limited to, appointment information, necessary information to be provided by the patient before an appointment, collateral information (e.g., physical therapy information to orthopedic patients) in a variety of formats (e.g., video), patient-client real-time communication/interaction, including patients' access to answers to FAQs that are relevant to that patient's particular needs and the like.

Yet, another example scenario where the zone network would provide advantages is where the zone site is a casino or hotel where a user may access a zone gateway device at the pool area and order food/drink from a menu displayed on the client device. The content provided by the gateway device 110 may allow the user to bill the costs of the food/drink to the user's hotel room or alternatively allow the user to use the third party payment vendor. Once the purchase transaction has been completed, the order is passed onto the hotel's restaurant in which the order indicates that the user has already paid for the order. Considering that the gateway device 110 knows the zone with which the user interacted with, along with optionally utilizing its GPS component, the order may place location information of the user so that the food/drink can be delivered to the correct individual(s). With regard to gambling, the casino may provide specific applications that are delivered to the client device when connected to a zone at the casino.

In another aspect, a plurality of zone can be deployed in a stadium, wherein each zone can allow sport fans to interact with localized content while at the stadium. In addition to a variety of product and service content, users can also watch interactive replays during a game, all served via WiFi from corresponding zone gateway devices. This can provide sport fans with a rich interactive experience, while eliminating the potentially heavy impact on the carrier's broadband wireless networks.

It is advantageous to allow payment services to be operated by gateway devices 110 at a zone site, as it products and services to be sold beyond the capacity of what is stocked in the local inventory. For example, a retailer can offer one or more combinations of 'guaranteed lowest price', 'free shipping', and other incentives to encourage consumers to buy a product via a zone gateway device upon physically inspecting a showroom version of the same product at a store (that is also a zone site).

As shown in FIG. 1B, the zone site includes a fuel island 95 having one or more gas pumps that are in communication with a fuel control station 94. The fuel control station 94 is coupled to a switch at or near a cash register 96 in which operation of the gas pumps at the island 95 is controlled by the cashier via the pump control station 94. As shown in FIG. 1B, a zone gateway device 110(7) provides a zone at the fuel island 95 wherein unique consumer content can be provided to the client device at the pump. Such consumer content may include promotional offers, offers to earn loyalty points and/or other marketing campaigns to encourage users to visit inside the building 99 for additional shopping and the like. Alternatively consumers can also be provided discounts for additional services like a car wash, oil change etc. In another example, a gas station owner can likely drive additional sales once a consumer steps inside their store. To accomplish this, consumer content provided by gateway device 110(7) may display "Login to our Store Zone to view special deals".

The zone gateway devices 110, by virtue of being physically located at different areas of a zone site may use advertising practices to motivate consumer to go inside a particular store or go visit another store to take advantage of the offers provided via the zone.

In an aspect, as is described in more detail below, the gateway device 110(7) can provide the web-based online payment solution to allow the user to pay for the fuel purchase using the online payment via the client device. Considering that gas stations typically have a policy that the consumer must pay for gas prior to actually being able to pump it, the gateway device 110(7), once being able to determine that the payment has been successful using the online payment solution, can send an instruction command directly to the control station 94 (or other appropriate network enabled device) to turn on the valve at the gas pump and allow the user to dispense the gas.

The zone gateway devices 110 can be operated and managed independently of one another or can operate and be managed to share data over the zone network 106. Such an interconnected zone network would enable coordination and shared resources among available gateway devices. For example, by allowing the gateway devices 110 to communicate with one another at the zone site 106, a new or returning consumer can connect with one gateway device, whereby that consumer's credential information is communicated to the other gateway devices at the zone site. As a result, the zone network will require the consumer to register or log-in only once so that the consumer can visit any zone at the zone site 106 without having to login multiple times.

As illustrated in FIG. 1B, a client device 101C may be located within range of two or more zone gateway devices 110(1) and 110(2). In this aspect, once the user, along with his/her client device 101, is connected to gateway device 110(1), s/he will to automatically be 'handed-off' to the zone provided by gateway device 110(2) upon walking into that zone. As a result, the user will automatically receive updated published content from the zone gateway device 110(2) without requiring additional user interactions.

In particular to this aspect, the system supports techniques to allow the client device 101 to connect to the right zone gateway device 110 based on configurable criteria. In another aspect, the user via his/her client device 101, is provided the option to select a preferred zone to interact with. In yet another aspect, one or more zone gateway devices may be preconfigured to be loaded with the content of another zone gateway device (in overlapping zones) to enable the client device 101C to receive content from both zone gateway devices 110(1), 110(2).

Figure 2A:
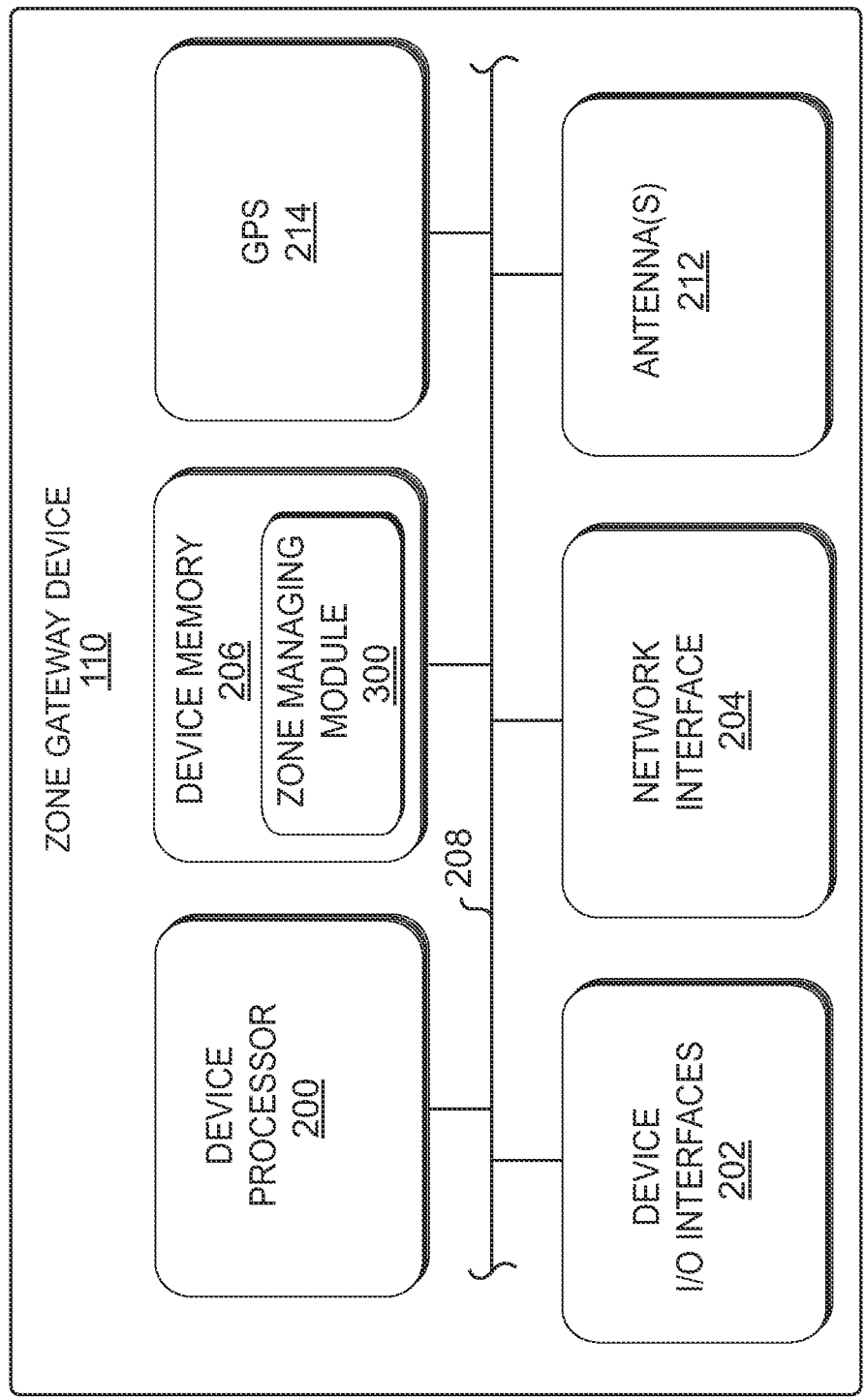
FIG. 2A illustrates a block diagram of a zone gateway device configured to implement a zone managing module in accordance with an aspect of the present disclosure.
Figure 2B:
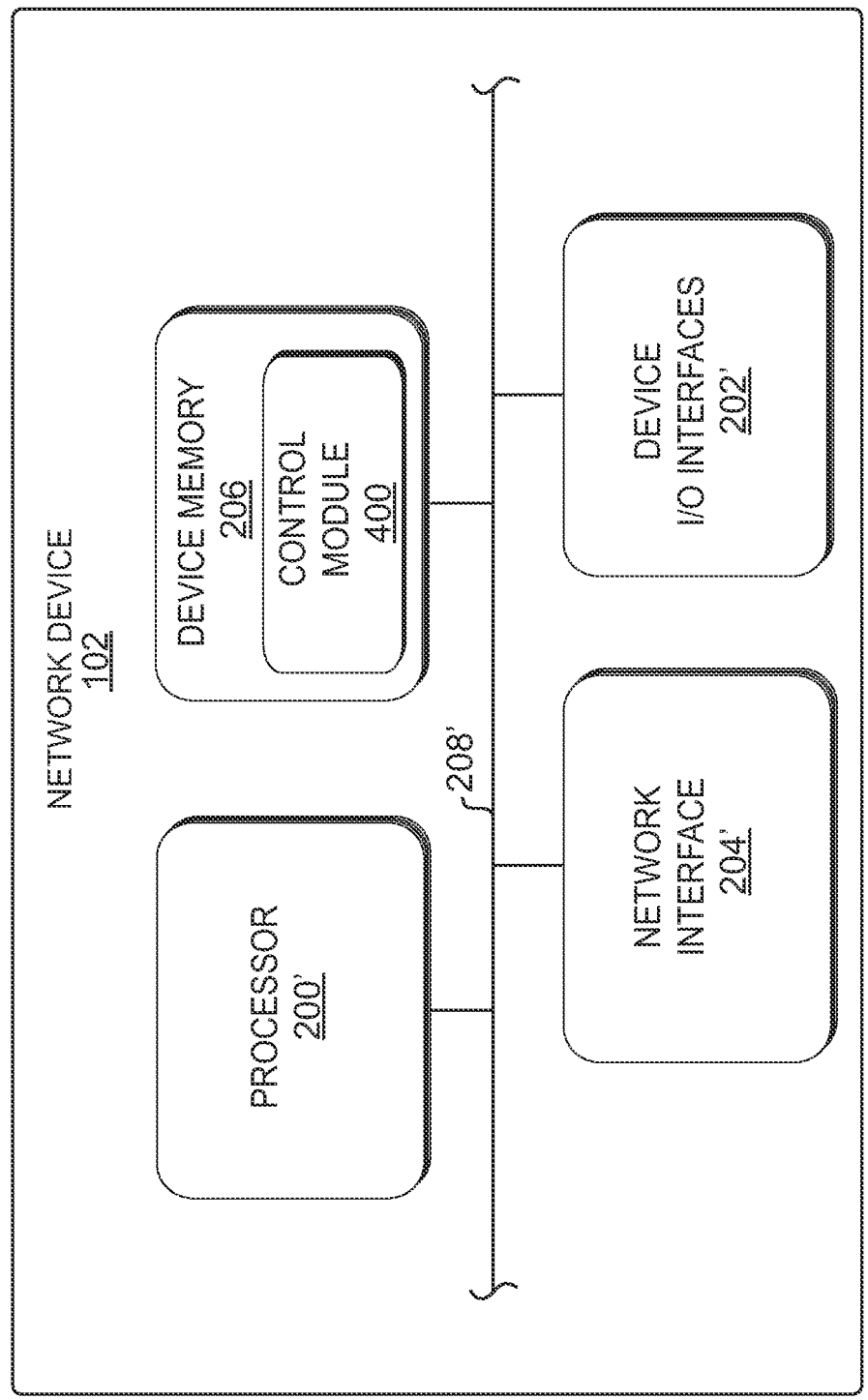
FIG. 2B illustrates a block diagram of a network enabled device configured to implement a control center module in accordance with an aspect of the present disclosure.

FIG. 2A illustrates a block diagram of a network enabled zone gateway device for use in the system in accordance with an aspect of the present disclosure. FIG. 2B illustrates a block diagram of a network enabled device configured to implement a control center module in accordance with an aspect of the present disclosure.

The gateway device 110 in FIG. 2A includes one or more device processors 200, one or more device I/O interfaces 202, one or more network interfaces 204, one or more device memories 206 including a zone managing module 300, one or more Global Positioning System components 210 and one or more wireless enabled antennas 212, all of which are coupled together by one or more buses 208. Although not shown, the zone gateway device 110 may implement hardware and/or software components that allow the gateway device 110 communicate data associated with Bluetooth, NFC or any other communication medium protocol. Although not shown, one or more zone gateway devices 110 may include physical ports which can be used to selectively power other devices via Power over Ethernet (P.O.E.) (i.e. 802.3af/t).

The network device 102 in FIG. 2B includes one or more device processors 200', one or more device I/O interfaces 202', one or more network interfaces 204', and one or more device memories 206' including a control module 400, all of which are coupled together by one or more buses 208'. The zone manager module 300 and control module 400 are implemented as executable software code tangibly embodied on the non-transitory computer medium of the device memory 206, 206' or other remote memory outside of the devices 102, 110.

Device processor 200, 200' comprises one or more microprocessors configured to execute computer/machine readable and executable instructions stored in the respective local device memory 206, 206' or in a remote device memory (not shown). Such instructions are implemented by the processor 200, 200' to perform one or more functions described in relation to the present system described herein. It is understood that the processor 200, 200' may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 202, 202' comprise one or more user input and output device interface mechanisms. The interface may include a computer keyboard, touchpad, touchscreen, mouse, display device, and the corresponding physical ports and underlying supporting hardware and software to enable access by one or more zone stakeholder. Although the device I/O interface 202, 202' is described above as one or more hardware components, it is contemplated that the interface 202, 202' may be configured as software, wherein the zone stakeholder can access the zone network from another computing device via a user interface. Such communications include, but are not limited to, accepting user data input and providing output information to a user, programming, accessing one or more memory devices and administering one or more functions to be executed by the corresponding device and the like.

Network interface 204, 204' comprises one or more mechanisms that enable the devices 102, 110 to engage in TCP/IP or other communications with the various client devices 101, via the zone hotspot, as well as the server devices 102, via the network 104. The network interface 204 as well as antenna 212 can be configured to not only support 802.11 wireless protocols to communicate with client devices and other zone gateway devices 110, but also communicates to the control center 400 via a secure or non-secure communications connections. These 'back-side' or server side connections may be done using hardwire Ethernet, wireless Ethernet landline, cable, T1, T2, T3 networks but also 3G/4G supported mobile cellular networks. However, it is contemplated that the network interface 204, 204' may be constructed for use with other communication protocols and types of networks. Network interface 204, 204' is sometimes referred to as a transceiver, transceiving device, or network interface card (NIC), which transmits and receives network data packets over one or more networks.

Further, the network interface 204, 204' may include one or more physical ports, such as Ethernet ports, to couple its respective device with other network devices in the system 100. Moreover, the network interface 204, 204' may include certain physical ports dedicated to receiving and/or transmitting certain types of network data, such as device management related data for configuring the respective device, and the like.

Bus 208, 208' may comprise one or more internal device component communication buses, links, bridges and supporting components, such as bus controllers and/or arbiters. The bus 208, 208' enables the various components of the device 102, 110 to communicate with one another. However, it is contemplated that the bus 208, 208' may enable one or more components of its respective device 102, 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the device 102, 110 which houses the bus 208, 208'.

Device memory 206, 206' includes non-transitory computer readable media, namely computer readable or processor readable storage media, which are examples of machine/ processor-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the device 102, 110.

Such storage media stores computer readable/machine-executable instructions, data structures, program modules and components, or other data, which may be obtained and/or executed by one or more processors, such as device processor 200, 200'. Such stored instructions allow the processor to perform actions, including implementing an operating system for controlling the general operation of the device 102, 110. In an aspect, the device memory 206 can store user profiles, content profiles, policy information, network interface data, such as antenna gain and direction instructions, generic and specific device operation information, merchant profiles, sponsor profiles, on-line payment middleware, publishing and business rules, QoS rules and the like. It should be noted, however, that some or all of the above listed data may be stored in one or more other secure databases 10.

In an aspect, as shown in FIG. 2A, the gateway device 110 includes one or more GPS components 210 which can be used to determine the location of one or more client devices 101 within a zone and/or among zones at a zone site 106. The GPS components 210 may be hardware and/or software based components which monitor signal strength of the client devices 101 to pinpoint their locations. It is contemplated, however, that the GPS component 210 be operate with other components in the gateway device 110 to allow communication with other zone gateway devices in the zone network to perform triangulation techniques to determine the location of one or more client devices 101.

As shown in FIG. 2A, the gateway device 110 includes one or more antennas 212 configured to generate wireless signals associated with a WiFi connection. The antenna 212 accordingly propagates wireless signals of assigned gain and direction based on instructions provided by one or more zone stakeholders. The antenna 212 may be exterior or interior to the gateway device 110. Further the zone gateway device 110 may be configured with only one antenna or multiple, individual antennas. The antenna 212 is configured to operate in conjunction with known data communication protocols, including the 802.11 family of wireless communication protocols, Wireless Gigabit Alliance (WiGig) protocol, and the like.

Figure 3:
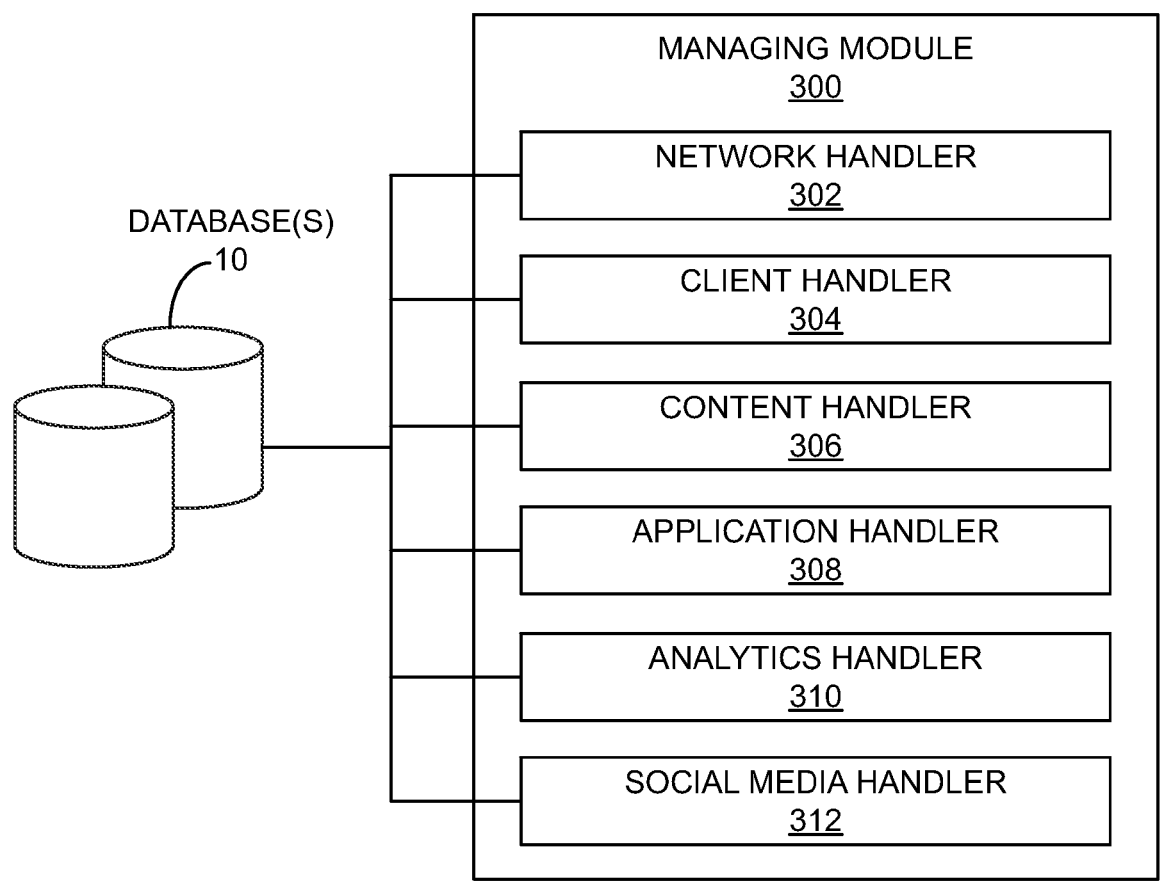
FIG. 3 illustrates a block diagram of the zone managing module in accordance with an aspect of the present disclosure.

FIG. 3 illustrates a block diagram of the zone manager module of the zone gateway device in accordance with an aspect of the present disclosure. As shown in FIG. 3, the zone managing module 300 (also referred to as 'zone manager') may include a network handler module 302, a client device handler module 304, a content handler module 306, an application handler module 308, an analytics handler module 310, and a social media handler module 312. It should be noted that the various modules of the zone manager are exemplary to describe the novel system and should not be taken as limiting in any way.

In an aspect, the network handler 302 is configured to allow effective communication between the zone gateway device 110 and one or more server devices 102, dedicated merchant devices (e.g. gas fuel controller, cashier terminals) and/or other gateway devices 110 in a zone network 106. As will be discussed below, one or more gateway devices 110 may be remotely accessed and/or configured by one or more zone stakeholders via the control module 400. The network handler 302 performs the appropriate connections and handling of data communicated, via network interface 204 and/or antenna 212, between the zone gateway device 110 and the network devices operating the control module 400 as well as data communicated with other network enabled devices and associated applications (e.g. online third party payment transaction servers).

The client device handler module 304 is configured to perform functions which involve general communications with client devices 101 (e.g. memberships, loyalty programs, user profiles, customized consumer experiences). Regarding memberships, the client device handler 304 may enroll new memberships for users by displaying new user enrollment templates, receiving user information for new memberships and storing such information into a memory. In an aspect, the client device handler module 304 may display user sign-in pages and receive login and password information input from the user. The client device handler module 304 may be configured to access and/or modify existing memberships from one or more memories/databases. It is contemplated that the membership data is stored in a memory that is local to a particular zone gateway device 110. However, it is possible that the membership data can be stored in one or more databases 10 accessible by more than one zone gateway device in the overall zone network. The one or more databases 10 may owned and operated by one or more zone stakeholders as the membership data and metadata can be either the property of those zone stakeholders, depending on business arrangements.

In an aspect, a user can enroll into the zone system from his/her client device 101 or through another computing device via a website, a Point of Sale device, a kiosk and the like. In an aspect, the user is able to enroll into the zone system and have access to only one zone site, although it is contemplated that the user can alternatively be able to have access to all zones among all available zone sites.

Upon enrollment, a user profile is created for the user that is stored locally on the gateway device 110 and/or in one or more databases 10. The user profile contains information of the user, identifying information of the user's one or more registered client devices 101, zone site and/or zone network browsing history, downloading history, purchasing history, loyalty profile history, third party analytic data of the user which provides information of the user's product/service preferences, data associated the user's interests as well as data relating to the likelihood of purchase by the user based on location and/or store, user's credit card(s), or other payment options, product warranties and associated documents, receipts, language preference and the like.

In an aspect, the user's information that is stored in the user profile may be provided by the user by manually entering such information via his/her client device 101. Alternatively, user information can be imported in from a third party database and stored in the user profile.

In an aspect, enrollment tiers can be offered to the user by the zone system. For example, during an enrollment campaign at a particular zone site, users may be asked to send an SMS text message to an enrollment number or an email to an email address. Once the user texts or email this information, the zone system will have the user's mobile phone number or email address and will encourage the user to complete their enrollment and create an account with or without payment information on an online enrollment form. Optionally, the user's client device MAC address may also be used as part of the initial enrollment and associated with the newly created user profile. In an aspect, the zone system may utilize the client device's MAC address to track that client device's interactions with other zone gateway devices for analytics purposes. Optionally, MAC addresses can be anonym-zed in order to comply with privacy regulations.

In an aspect, the client handler 304 can perform authentication procedures on the user as well as his/her client device 101 to allow the user to move between different zones within a zone site (or among zone sites in the overall zone network) without requiring the user to log in again.

In an aspect, the client handler 304 is able to work in conjunction with the application handler 308 and social media handler 312 to track and store any browser-based activities that the user performs on his/her client device and provide that collected to data to one or more software applications and/or social media sites. One such example of a browser-based activity is when the user has 'bookmarked', or selected as a "favorite", a specific product or service that s/he would like to view at another time. The client device 101 will communicate this action to the gateway device 110, wherein the gateway device will translate the selected internal URL (from the content page) into an externally accessible URL with equivalent information, whereby the translated URL will be stored in the user profile for the particular zone. The bookmarked information may be just a subset (e.g., a 'teaser') of the total content that is available to the user when s/he is in the Zone, and may serve as an incentive for the user to return to that zone. Accordingly, the information stored along with the user selected bookmark can provide geographic mapping applications to allow the user to find that particular zone in the future using GPS mapping instructions provided along with the stored bookmark information. Optionally, full content of one or more zones that the user previously visited may be accessible by the user via webpage.

The content handler module 306 of the zone managing module 300 is configured to publish and push consumer content, in conformance with a locally stored content profile, to client devices 101 connected to the gateway device 110. In an aspect, the content handler module 306 works in conjunction with the client handler module 304 to publish content data that is specific and unique to the zone as well as the user's profile.

The applications handler 308 of the zone manager module 300 allows third party developed software applications to be able to be run on zone gateway device(s) 110 and/or client device(s) 101. Some non-limiting examples of applications that are handled by the applications handler 308 include mobile payment services, loyalty programs, games, chat applications, widgets, links and the like.

Regarding mobile payment services, the zone gateway device 110 utilizes software applications provided and operated by one or more third party payment vendors (e.g. PayPal, Google Wallet, BillMeLater, various credit card vendors). In particular, the applications handler 308 interfaces with third party payment vendor APIs or other user interfaces and ensures secure handling of sensitive user data to allow secure communication of data between the client device 101 and the third party payment vendors' dedicated transaction servers over the network 104. Accordingly, from the user's point of view, the client device 101 will display a payment API that is provided by the gateway device 110, wherein the API allows the user to input which product/service(s) s/he would like to purchase as well as indicate the amount that s/he would like to pay. Once the user selects the "submit" or "purchase" button on the displayed user interface, the transaction information is handled by the transaction handler 308 along with the third party payment vendor's system over the network 104. After completion of the transaction, the transaction handler 308 will handle the relay of data to the client device 101 from the third party payment vendor.

The analytics handler module 310 of the zone manager module 300 allows tracking and analysis of user activity within one or more zones. User interactions within or between zones may be tracked by the analytics handler module 310 for intelligence purposes, whereby the tracking information may provide value added services to one or more third parties. As a non-limiting example, whenever a consumer accesses a zone, his/her presence can be signaled in real-time to his/her credit card companies, who may respond by sending targeted offers to the zone gateway device 110 over the network 104, wherein the zone gateway device 110 may wirelessly push the received offer(s) to the client device 101 via the zone. These incentives could also be offered to the user to motivate him/her to visit other identified zones to earn additional points.

With regard to the user profile, the client handler 304 is configured to personalize a user's experience with the zone system, thereby allowing him/her to take advantage of targeted loyalty/advertising services. In particular to an aspect, the client handler 304 may utilize targeting algorithms as well as monitored analytics (from the analytics handler 310) to create content that is personalized to the user. User behavior data can be stored in a centralized location and shared between zone gateways for local targeting and personalization to the user while the user is connected to any zone in the zone system. As a result, each merchant or venue operator can immediately benefit from personalization when a user enters any zone, relatively independent of the number of previous visits to their establishment.

The social networking module 312 of the zone manager module 300 provides an interactive platform that allows the user to share his/her experience with one or more friends over one or more social networks that the user belongs to. In particular, the user, via the browser displayed on the client device 101, can select one or more social network radio buttons to share their check-ins or other interactions with their friends in his/her social networks. In an aspect, the user, via the browser on his/her client device, is able to perform an equivalent of a 'physical like' of a product or service that is shown as content by the gateway device 110. In other words, the user, by "liking" a product or service will cause the browser on his device 101 to tag a product and share that tag with the user's social network while also confirming that the user was in physical proximity to that product. Recommendations from members of the network and other related metadata can be stored in related databases and can be readily accessed via the zones by visiting users. In an aspect, the gateway device may allow a user to send and receive texts or other real time messages with others through the WiFi zone in order to exchange tips, recommend products or compare their experience.

In an aspect, one or more zone stakeholders can run social network based incentive programs, such as enrollment rallies, discounted social group buying events, or interactive games, to encourage participation of other users in the same or other zones. In an aspect, the gateway devices 110, in conjunction with the communication abilities of existing social network sites, can be used to alert a user's friends of existing or ad-hoc purchasing opportunities in a given zone, such as participating in group buying events.

In an aspect, the analytics handler 310 may interface with the social media handler 312 to monitor and track user activity data of products/services discussed in a social network platform, wherein the user activity data, with prior permission of the user, can be made available to merchants, zone administrators or zone sponsors. For example, user activity monitored over a social networking tool can provide analytics information regarding the number of visitors who visited the zone after an initial post by the user was posted, how many messages or discussions occurred regarding the initial post, the types of comments, number of likes by other friends, etc.

The social media handler 312 can operate separately from the existing third party social networks (e.g. Facebook, Twitter, Foursquare), wherein the user's social interactions may or may not be shared with those third party social networks. Thus, in one embodiment a Social Network can exist strictly within a Zone, or between Zones, and can only provide access to localized content specific to the Zone(s). A Social network can also allow for anonymous interactions. Members may be able to opt-out/opt-in to indicate whether they prefer to remain anonymous, or not. In one embodiment, some features of third party Social networks may be localized into the Zone provider's Social network. For instance, the Social network can show third party network social connections (a.k.a. 'friends') that are also enrolled into the system, and/or are present at Zone, and/or have identified their affinity for certain products or services, etc. Personalized offers may also be tailored to incite social group behavior.

In an aspect, zone activity data can also be aggregated into online portals and be made available to members, similar to social networking and micro-blogging services, like Twitter and others. A visitor to such a portal can see trends like the most popular Zone activities, or use this site to locate a Zone, based on a set of keywords, e.g., Zones that feature "hybrid car sales". Additionally, location-based geographical mapping applications supported on mobile devices could direct interested consumers to a specific Zone.

One or more of the above modules of the zone managing module 300 are able to freely store and retrieve data with regard to one or more databases 10, as shown in FIG. 3.

FIG. 4A illustrates a block diagram of the control center module in accordance with an aspect of the present disclosure. Much of the above description is directed to the functions performed on the zone gateway device 110. However, as mentioned above, each zone gateway device 110 is accessible and configurable remotely using a control module 400. As shown in FIG. 2B, the control module 400 is a processor executable software component which runs on one or more servers or other network devices (laptops, tablets), whereby the control module 400 allows one or more zone stakeholders to control operation of the zone gateway device(s) 110 as well as entire zone networks within or between many different, geographically remote zone sites.

As shown in FIG. 4A, the control module 400 includes a portal interface 402, a zone network interface 404, a network management module 406, a content management module 408, an administration module 410, an advertising module 412, an application module 414, a transaction platform 416 and an analytics platform 418. One or more of the above modules and/or platforms are configured to freely access, store and retrieve data in one or more databases 10.

The portal interface 402 provides a user interface through which one or more zone stakeholders are able access the control module 400 and configure the zone gateway devices and/or zone network. The portal interface 402 is configured to handle, such as establishing, modifying and enforcing access and security policies to ensure that each zone stakeholder does not violate any security or clearance protocols. The portal interface 402 can provide accounting services for zone stakeholders providing consumer content as well as provide the tools and resources to add consumer profiles, devices and stakeholder merchants to the zone network.

The zone network interface 404 works in conjunction with the portal interface 402 and the network management module 406 to ensure that proper configuration, policy, content and other data is properly communicated to the intended zone gateway devices and that user data and other sensitive data received from the zone networks 106 is stored in the appropriate databases 10.

The network management module 406 handles generation operation and configuration data for the zone networks 106. In an aspect, the network management module 406 allows a zone network administrator to set up and configure new zone networks at zone sites, set up and configure new gateway devices 110 being added to an existing zone site, update existing zone gateway devices 110, conduct network traffic and load balancing analysis within a zone site's network or between zone sites, conduct health and diagnostic processes on one or more zone gateway devices 110 and/or zone network sites, configure antenna gain and direction settings, configure external internet access settings for any particular zone gateway device 110 as well as configure any other appropriate settings, configure overall general operational data and the like.

The network management module 406 is also configured to store and handle data of some or all of the zone networks 106 in the entire zone architecture. Such data includes, but is not limited to, the actual physical layout of each zone site itself as well as the locations where all the zone gateway devices 110 are physically located at the zone site. This information can be presented to an appropriate stakeholder in graphical and/or non-graphical format via the user interface provided by the portal. Other information handled by the network management module 406 include, but is not limited to, information of the merchant(s) for that zone site 106 (e.g. products carried, type of store, whether merchant is local/regional/national/international, locations of other zone sites operated by merchant)

The network management module 406 also stores and handles data regarding the content profiles stored on each corresponding gateway device 110 at the zone site 106. In particular, the network management module 406 may store information regarding the network addresses of the zone gateway devices in any zone site as well as their respective delivery policies. The network management module 406 also stores and handles data relating to the various security clearances that are assigned to all the zone stakeholders who access the zone architecture.

Figure 4B:
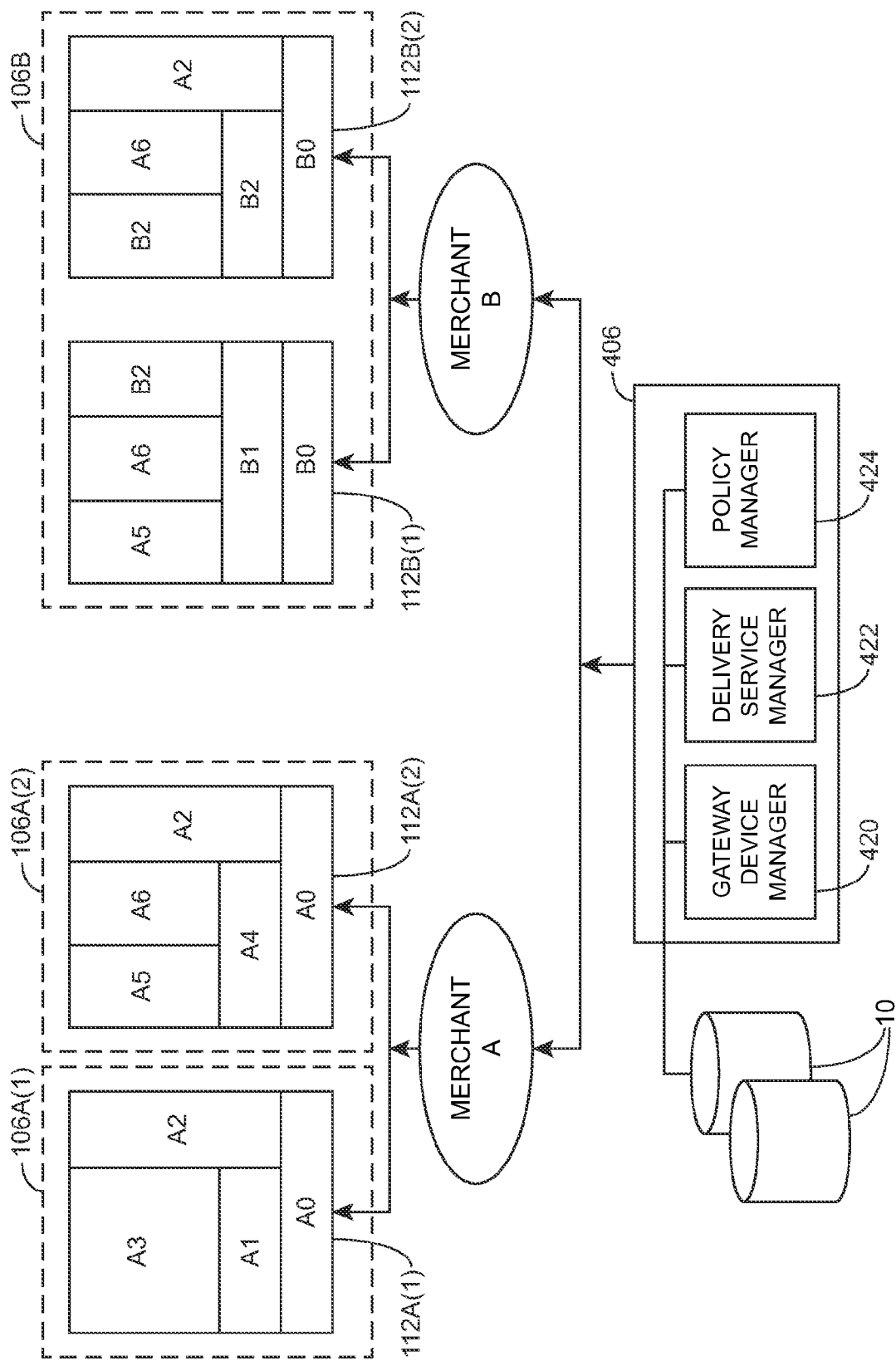
FIG. 4B illustrates a block diagram of a network management module of the control center module in accordance with an aspect of the present disclosure.

The content management module 408 allows content provider stakeholders to create, upload, manage and review their respective consumer content. As mentioned previously, the stakeholders which provide consumer content purchase or lease template components that make up the overall content template. Based on the deal that the content providers pay for, they are given content templates of certain size as well as location where their respective template components will appear in the displayed content page. For example, as shown in FIG. 4B, template component A3 is larger and located in a central area on the content template 112A, whereas template component A1 is relatively smaller. In this example, the cost of template component A3 would most likely be greater than the template component A1.

The content management module 408 also allows stakeholders, such as zone administrators, to create and design the various content templates via the zone portal user interface. Accordingly, a zone administrator can utilize the content management module 408 to create and design templates 112A(1), 112A(2), 112B(1), 112B(2) which are then put up for sale/rent to interested content provider stakeholders. In other words, zone administrators can license the various template components as well as provide access/service to the content providers to allow them to manage and run the template components they paid for, all of which is stored in a merchant profile and/or sponsor profile. Templates could be defined for various verticals, e.g., retailers, travel operators, tour operators, food services, event/concert promoters, fair organizers, political parties hosting rallies, automotive dealers, health care/hospital owners, mall operators, sport venues, government and military buildings and operation center and any other use in which remote distribution and management of rich content to localized zones is desired. The content management module 408 allows the content sponsors or other zone stakeholders to upload, in real time, targeted communications, advertisements, news updates that can be tied to marketing, and the like, to one or more template components. Once the newly uploaded content is ready to be deployed, the zone managing module 300 will immediately thereafter (or at another time that may or may not be designated by the content stakeholder) send the updated template component(s) to the one or more zone gateway devices identified by the content stakeholder.

The administration module 410 is configured to handle data with regard to sales accounts, and in particular provides an accounting system that stores merchant contract/pricing, performs billing/reporting functions as well as manages accounts and user administration policies. The administration module 410 provides the merchant profiles which are used by the network management module 406 and the content management module 408, as discussed in more detail below.

FIG. 4B illustrates a block diagram of a network management module of the control center module in accordance with an aspect of the present disclosure. As shown in FIG. 4B, the network management module 406 includes a gateway device manager 420, a delivery service manager 422 and a policy manager 424. The gateway device manager 420 performs registration and authentication processes for new gateway devices 110 that are added to the zone network 106. The gateway device manager 420 also uploads and injects authentication keys and encrypted URLs for consumer content to allow the consumer content to be secure and not subject to DNS attacks or other malicious activities. The gateway device manager 420 takes into account stored sponsor and merchant profile information to ensure that the proper consumer content is distributed to the proper zone gateway devices in accordance with the sponsor/merchant profiles.

The delivery service manager 422 centralizes the management of the various zone gateway devices in the zone network 106 as well as provides the varies policies and protocols to ensure optimized distribution of consumer content to the appropriate zone gateway devices 110, irrespective of zone site, merchant, content operators or other zone stakeholders. The delivery service manager 422 distributes the consumer content that is loaded into the various content profiles based on set delivery policies associated with Quality of Service (QoS) standards, business rules captured by the advertising module and merchant profiles handled by the administrative module. Accordingly, the delivery service manager 422 handles and coordinates the scheduling of identified content profiles to be distributed to the identified zone gateway devices. The delivery service manager 422 takes into account stored content metadata information to ensure that the delivery policies are consistent with the sponsor/merchant profiles.

The policy manager 424 provides assigned policy parameters that are to be enforced by the appropriate zone gateway devices 110 to ensure optimized handling of published consumer content in conformance with established Quality of Service (QoS) standards. In an aspect, the policy manager 424 provides such policy parameters like content priority, content size, amount of network traffic allowed to template component and time sensitivity information. The policy manager 424 may also provide policy parameters identifying what types of user activity as well as the amount of monitoring that a particular zone gateway device 110 is to perform for analytics purposes.

In an aspect, the policy manager 424 may contain policies regarding the level of security as well as encryption type that is to be applied to consumer content. As stated above, the zone gateway device 110 may be configured to provide data to a user in which the data is of a certain nature that requires certain established security procedures to be performed prior to it being transmitted over a network (e.g. gambling verification, user prescription drug information). The ability for the zone gateway device 110 to provide a 'closed' zone between the gateway device 110 and the client device 101 will support this highly-regulated activity. Further, the ability for zone stakeholders to load their specific applications to zone network 106 will allow them to implement the required security procedures into their applications and deploy them to the appropriate zone gateway devices 110.

The loyalty management module 410 is used to allow stakeholders to manage loyalty campaigns as well as offer new loyalty programs and keep track of user loyalty points accumulated and/or redeemed for registered users. The loyalty management module 410 is configured to operate with existing loyalty programs or introduce new loyalty programs provided by third parties. The loyalty management module 406 thus provides the ability for the zone network to leverage a known, existing card based loyalty program and expand it into a card-less digital interactive loyalty program. A further advantage is that the zone network 106 can leverage its ability to provide consumer content having loyalty features to a user's device 101 while the user is standing near the products that correspond to the loyalty program.

The advertising module 412 is configured to allow advertisers to create, upload and monitor advertising material that is placed in consumer content. The advertising module will handle advertising campaign management rules that will correlate with the merchant contracts and pricing defined in the merchant profile. The campaign management rules are implemented into the delivery policy rules handled by the delivery service manager 422.

The application module 414 is configured to allow third party software applications to be implemented into the zone network 106. In particular, the application module 414 allows interoperability and configuration between the applications to be run over the zone network 106 and the architecture of the zone network 106 as well as the individual gateway devices 110. In an aspect, the application module 414 may allow a software application to be uploaded and stored in a zone network database 10. In another aspect, the software application is stored in another network system, whereby the application module 414 accesses that other network system to execute the application. In this aspect, the application module 414 handles the connection and functions as a proxy server between the client device 101 and developer network system.

Some non-limiting examples of applications that are mobile payment services, loyalty programs, games, chat applications, and the like.

The transaction platform 416 is a transaction management and monitoring platform that will insure the enforcement of the QoS and performance policies for all the transactions defined in the merchant profile. Further, the transaction platform 416 is configured to allow third party payment vendors to deploy and implement different agnostic payment solutions over the zone network 106.

The analytics platform 418 monitors, tracks, analyzes and reports on data relating to user activity over the zone network 106. The analytics platform 418 allows for online and/or third party analytics to be used for targeting in a given zone. In an aspect, the shopping history and behavioral metadata of a user associated with his/her favorite online and/or brick-and-mortar retailer can be used by one or more zone stakeholders for targeting when he/she physically interacts with a given zone gateway device, regardless of the history with that particular zone gateway device.

Figure 5:
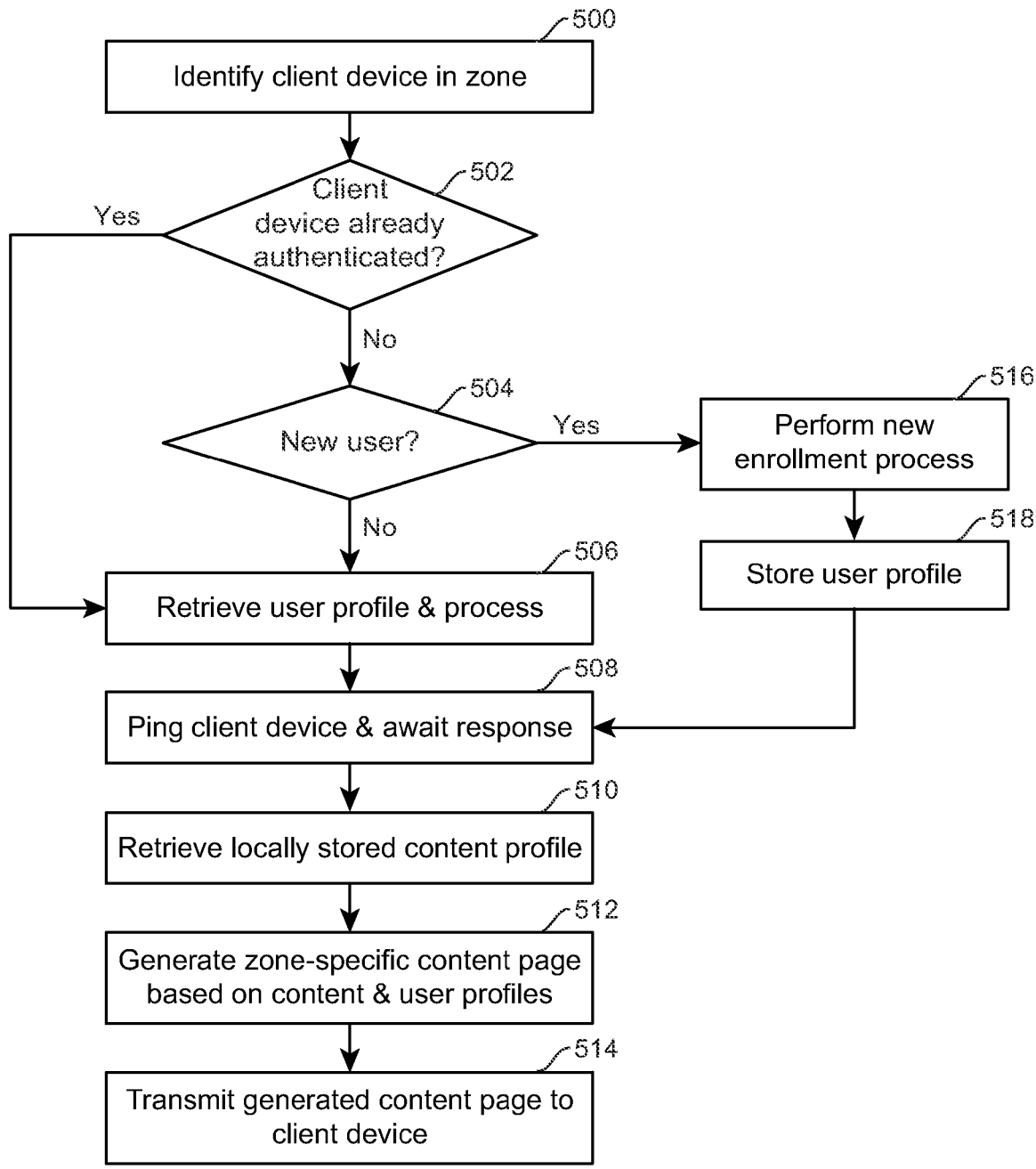
FIG. 5 is a flow chart which at least partially illustrates a method performed by the zone manager module in accordance with an aspect of the present disclosure.

FIG. 5 is a flow chart which at least partially illustrates a method performed by the zone manager module in accordance with an aspect of the present disclosure. As shown in FIG. 3, a user, holding a client device 101, enters into a wireless WiFi hotspot zone provided by a zone gateway device 110, wherein the zone gateway device 110 is able to monitor the client device 101. The gateway device 110 thereafter identifies the client device 101 by its MAC address or other identifying information (Block 500).

The gateway device 110 is able to perform automatic authentication procedures for the user by communicating with the client device 101, such as performing a challenge with the client device or other appropriate method. If the gateway device 110 determines that the user has been authenticated (Block 502), the gateway device 110 performs a lookup and retrieves the user's user profile from a central or local memory and processes the information (Block 506).

However, if the gateway device 110 determines that the user has not already been authenticated (Block 502), the gateway device 110 determines whether the user is a new user or an existing user (Block 504). If the user is a new user, the gateway device 110 performs a new enrollment process with the user (Block 516), wherein the user input information, once received, is stored in a user profile (Block 518). The user profile information is then used by the gateway device to ping the client device 101 and await a response (Block 508). The ping may be in the form of a request to the user that he or she join the zone network or merely display a welcome (or welcome back) page on the user's client device 101.

The gateway device 110 thereafter retrieves the locally stored content profile that is stored in its local memory (Block 510), whereby the gateway device will generate a zone-specific content page that is customized to the user, based on the user profile and the content profile for that zone (Block 512). This generated content page is then transmitted to the client device 101 (Block 514).

The user's input selection will be wirelessly sent to the zone gateway device 110 receives the selection input directly from the client device and thereafter pushes the appropriate consumer content page or provides the requested web service (e.g. audio file, video file) to the client device. The gateway device 110 stores the user activity as well as any input information or selections made by the user in a database 10.

Figure 6:
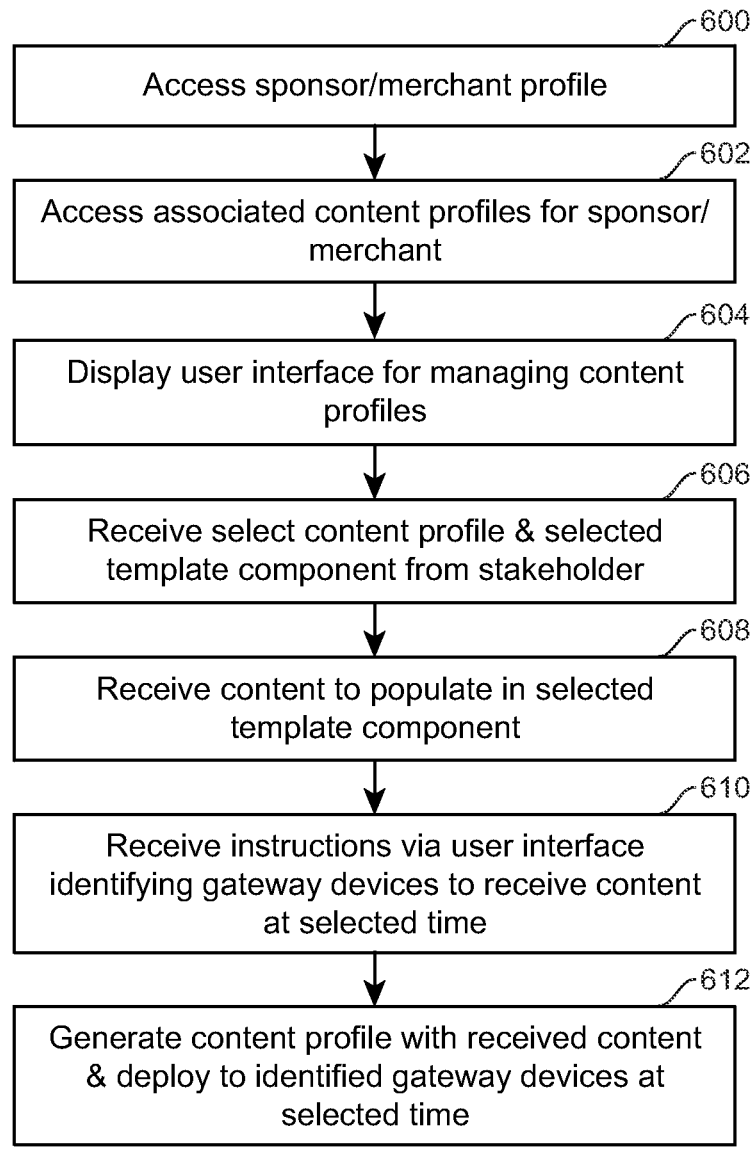
FIG. 6 is a flow chart which at least partially illustrates a method performed by the control module in accordance with an aspect of the present disclosure.

FIG. 6 is a flow chart which at least partially illustrates a method performed by the control module in accordance with an aspect of the present disclosure. As shown in FIG. 6, once a zone stakeholder, such as a sponsor or merchant, logs into the control module 400, the control module will access the profile of the particular zone stakeholder (e.g. merchant profile, sponsor profile) (Block 600). The control module 400, upon processing the stakeholder's profile, will be able to access the one or more content profiles and/or template components which are owned/licensed to the stakeholder (Block 602). The control module 400 thereafter presents the stakeholder with various options to perform, such as adding new content, deleting content, changing content and the like (Block 604). Other data presented to the stakeholder are the various identified gateway devices in the zone network which have locally loaded content profiles that have template components which are owned/operated by that stakeholder.

The control module 400 may receive a selection from the stakeholder which identifies one or more content templates or entire content profiles which s/he would like to update (Block 606). The control module 400 also receives the actual content or is provided with a link to interface with the stakeholder's network system to access the content directly from the other network system, whereby the content is to be populated into the designed content template(s) identified by the stakeholder (Block 608). Additionally, the control module 400 receives instructions from the stakeholder identifying which zone gateway devices 110 are to receive the new content and when the deployment is to occur (Block 610). The control module 400 thereafter processes the updated content profile and deploys it to the one or more identified zone gateway devices at the designated time (Block 612)

While embodiments and aspects have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A location based wireless consumer interactive system comprising:

a first gateway device stationed at a first location, the first gateway device further comprising:

a first antenna configured to generate a first wireless zone covering a preassigned area proximal to the first location;

a first network interface coupled to the first antenna, the first network interface configured to communicate with a mobile client device that is connected to the first wireless zone;

a first memory configured to store a first content profile received from a server device via the first network interface, the first memory configured to store executable programming instructions to process preloaded consumer content of the first content profile, the first content profile further comprises a content template including one or more template components, each template component is configured to have corresponding assigned consumer content portion, each assigned consumer content portion for the first profile is stored in the first memory; and a first processor configured to execute the programming instructions which causes the first processor to generate a first interactive content site containing the consumer content of the first content profile and send the first interactive content site to the mobile client device, the first gateway device remotely configurable via a control system executed on a network device configured to communicate with the first gateway device via a zone stakeholder interface, the first gateway device configured to execute a first application received from the control system and locally stored in the first memory, wherein the client device executes a first service associated with the first application via the first gateway device;

a second gateway device stationed at a second location proximal to the first location, the second gateway device further comprising:

a second antenna configured to generate a second wireless zone covering a preassigned area proximal to the second location;

a second network interface coupled to the second antenna, the second network interface configured to communicate with the mobile client device when the mobile client device is connected to the second wireless zone;

a second memory configured to store a second content profile received from a server device via the second network interface, the second memory configured to store executable programming instructions to process preloaded consumer content of the second content profile, the first content profile is different than the second content profile such that the first interactive content site accessed by the mobile client device is different content than the second interactive content site accessed by the mobile client device; and a second processor configured to execute the programming instructions which causes the second processor to generate a second interactive content site containing the consumer content of the second content profile and send the second interactive content site to the mobile client device, wherein the first content profile includes deployment information identifying a third zone gateway device to receive the associated consumer content the third zone gateway device located at a third location at a second zone site remote from a first zone site.

2. The interactive system of claim 1, wherein the first and second zone gateway devices are located at a first zone site, the first and second zones configured to not geographically overlap.

3. The interactive system of claim 1, wherein the first and second gateway devices are configured to automatically display the second interactive web enabled site upon the mobile client device moving from the first wireless hotspot zone to the second wireless hotspot zone.

4. The interactive system of claim 1, wherein a first product is located within the first wireless zone, the first content profile including first consumer content relating to the first product such that the first consumer content is displayed on the mobile client device while the mobile client device is connected to the first wireless zone and the first product is physically located proximal to the mobile client device.

5. The interactive system of claim 1, wherein the first gateway device is configured to restrict the mobile client device from accessing web services other than the consumer content of the first content profile that is locally stored in the first memory.

6. The interactive system of claim 1, wherein the first gateway device is connected to a Point of Purchase (POP) station, the first content profile configured to allow a user to perform a purchase transaction using a pay service via the first web enabled interactive site, wherein the first gateway device communicates the purchase transaction with the POP station and the pay service.

7. The interactive system of claim 1, wherein a first gain of the first antenna and a second gain of the second antenna is remotely adjustable via the zone stakeholder interface.

8. The interactive system of claim 1, wherein the first gateway device is configured to automatically receive an updated version of the first content profile from the control system via the network interface, wherein the first gateway device processes the updated version to be able to send updated consumer content for the updated first content profile to the mobile client device for display.

9. The interactive system of claim 1, wherein at least the first and second gateway devices are configured to collect user activity data when the mobile client device, wherein the first and second gateway devices transmit the collected user activity data to a zone network database, wherein analyzed data associated with the collected user activity data can be viewed via the zone stakeholder interface.

10. The interactive system of claim 1, wherein the first gateway device further comprises a locator component configured to determine a location of the mobile client device while at the zone site.

11. The interactive system of claim 1, wherein the first content profile includes deployment information identifying the first zone gateway device to receive the associated consumer content.

* * * * *